US008108194B2

(12) United States Patent
Zhu et al.

(10) Patent No.: US 8,108,194 B2
(45) Date of Patent: Jan. 31, 2012

(54) PEAK POWER DETECTION IN DIGITAL DESIGNS USING EMULATION SYSTEMS

(75) Inventors: Bing Zhu, Fremont, CA (US);
Tsair-Chin Lin, Saratoga, CA (US);
Tung-sun Tung, Cupertino, CA (US);
Jingbo Gao, Saratoga, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 431 days.

(21) Appl. No.: 12/346,004

(22) Filed: Dec. 30, 2008

(65) Prior Publication Data

US 2009/0271167 A1    Oct. 29, 2009

Related U.S. Application Data

(60) Provisional application No. 61/048,000, filed on Apr. 25, 2008.

(51) Int. Cl.
*G06F 17/50* (2006.01)
*G06F 9/455* (2006.01)

(52) U.S. Cl. ............................. 703/14; 703/18; 716/109

(58) Field of Classification Search ................ 703/5, 14, 703/16, 18, 23, 19; 716/109, 117
See application file for complete search history.

(56) References Cited

U.S. PATENT DOCUMENTS

| 5,036,473 A | 7/1991 | Butts et al. |
| 5,109,353 A | 4/1992 | Sample et al. |
| 5,475,830 A | 12/1995 | Chen et al. |
| 5,551,013 A | 8/1996 | Beausoleil et al. |
| 5,960,191 A | 9/1999 | Sample et al. |
| 6,035,117 A | 3/2000 | Beausoleil et al. |
| 6,051,030 A | 4/2000 | Beausoleil et al. |
| 2006/0277509 A1* | 12/2006 | Tung et al. ................ 716/5 |

OTHER PUBLICATIONS

Chi-Ping Hsu, "Pushing Power Forward with a Common Power Format—The Process of Getting it Right"; EETimes, Nov. 5, 2006.

* cited by examiner

*Primary Examiner* — Paul Rodriguez
*Assistant Examiner* — Eunhee Kim
(74) *Attorney, Agent, or Firm* — Schwegman, Lundberg & Woessner, P.A.

(57) ABSTRACT

A method of analyzing power consumption for a DUT (device under test) that includes an integrated circuit or an electronic system includes: providing emulation data for states of the DUT in one or more time windows; determining operational mode values from the emulation data and a selection of operational modes that characterize circuit behavior in the one or more time windows; dividing each time window into one or more segments based on at least one power criterion; determining power-activity values for the one or more segments; determining power-consumption values for the one or more segments from the power-activity values; using the power-activity values and the power-consumption values to determine relative power activity across the one or more segments and adjusting the one or more segments to target high power activity over operational modes in the one or more time windows; and saving one or more values for power activity of the DUT in a computer-readable medium.

27 Claims, 22 Drawing Sheets

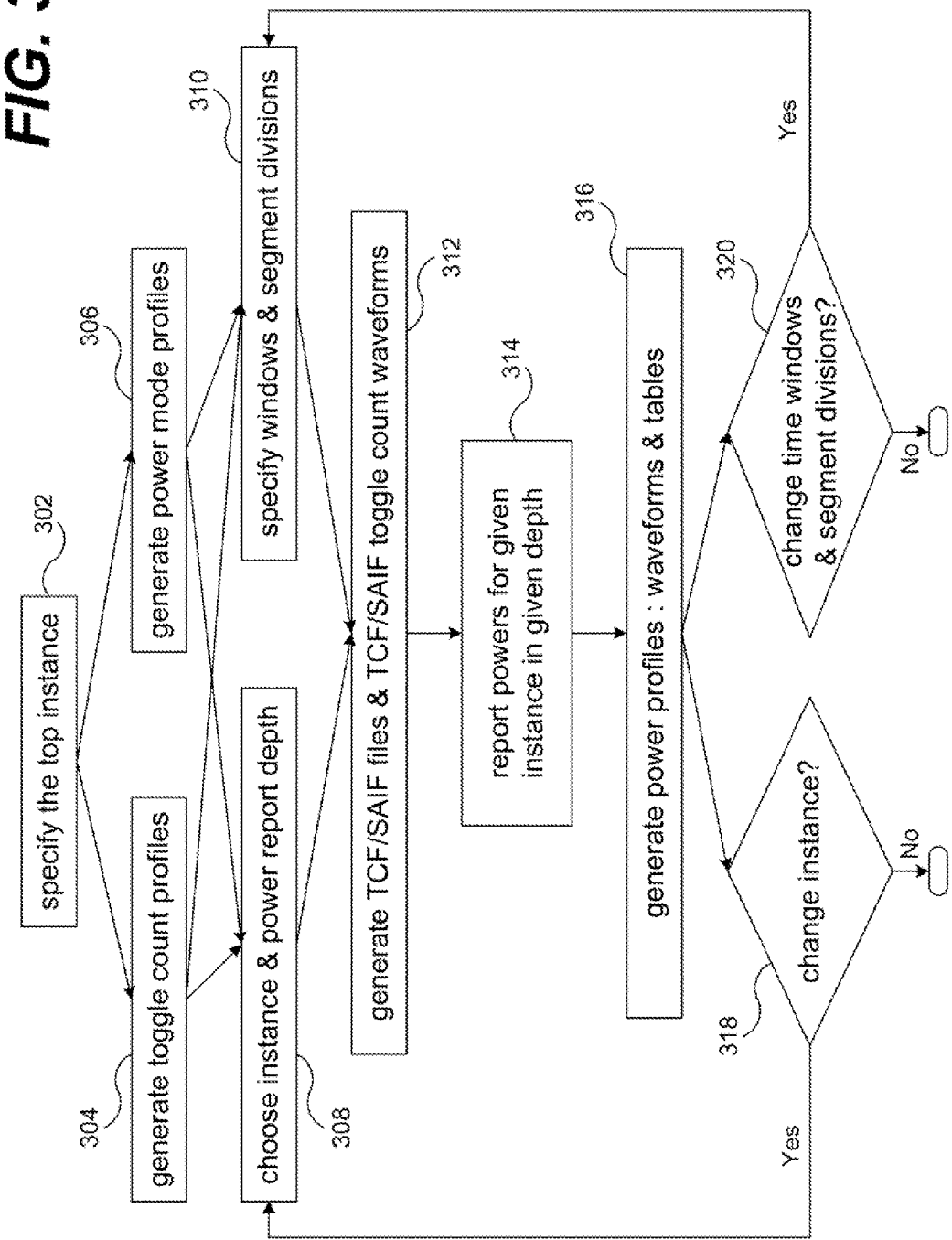

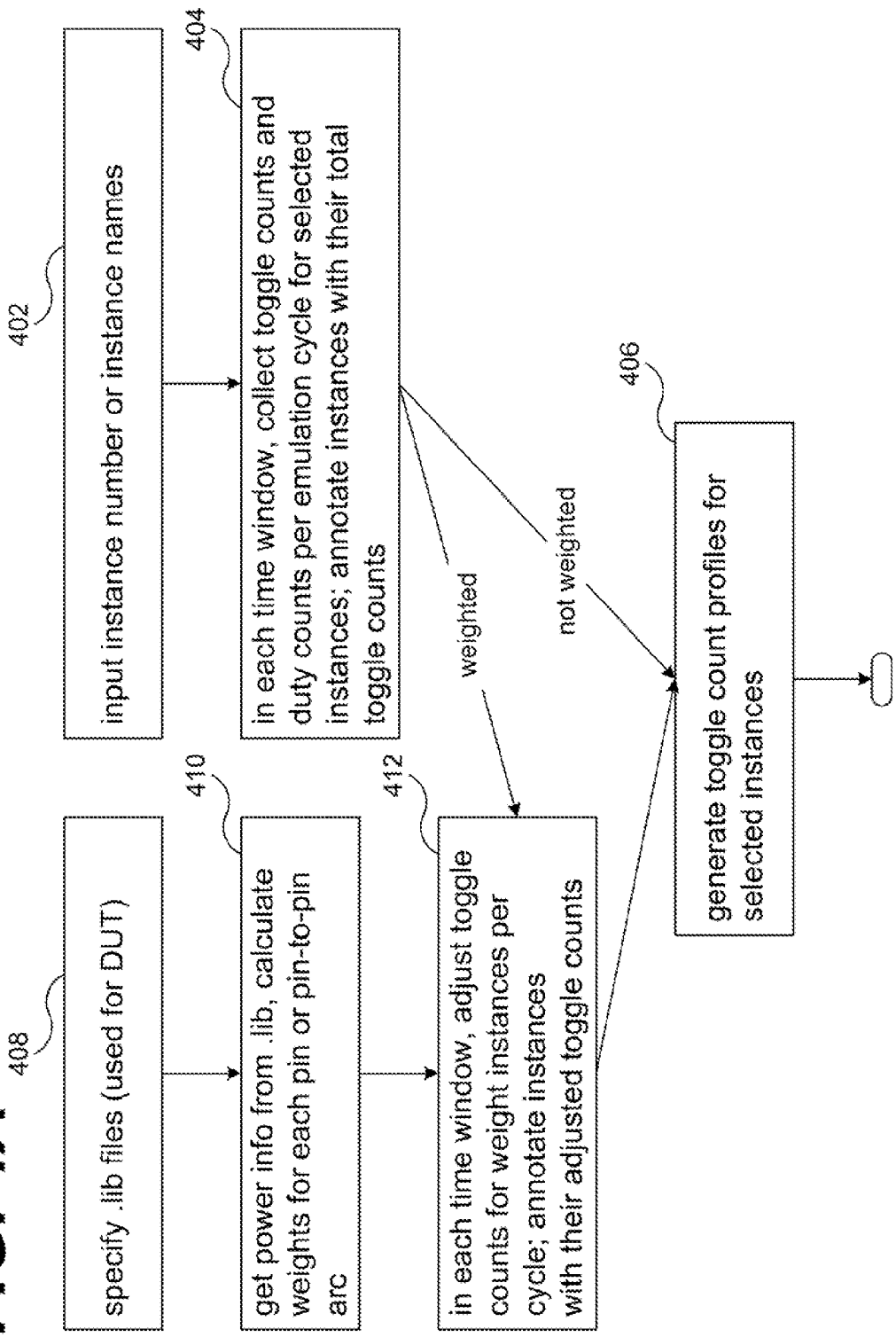

FIG. 4C

420 — Toggle Count
- In each emulation clock cycle:
  $ToggleCount = \sum$ *number of pins toggling from 0 to 1 or from 1 to 0*

422 — Weighted Toggle Count
- Each pin driven by a gate gets a weight from the gate cell power model.
- Each arc on a macro gets a weight assigned from the macro power model when the power arc conditions are true.
- In each emulation clock cycle:
  $WeightedToggleCount =$
  $\sum$ weighted *number of pins toggling from 0 to 1 or from 1 to 0* +
  $\sum$ weighted *number of active arcs*

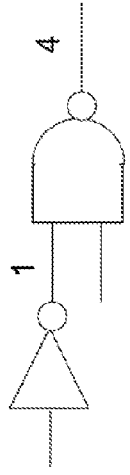

Weighted Toggle Count = 5

426

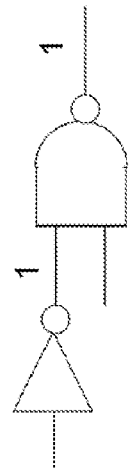

Toggle Count = 2

424

FIG. 9  Functional blocks power consumption table

| | segment1 | segment2 | segment3 | segment4 | segment5 | segment6 |
|---|---|---|---|---|---|---|
| Functional block 1 | P11 | P12 | P13 | P14 | P15 | P16 |
| Functional block 2 | P21 | P22 | P23 | P23 | P25 | P26 |
| Functional block 3 | P31 | P32 | P33 | P34 | P35 | P36 |
| Functional block 4 | P41 | P42 | P43 | P44 | P45 | P46 |
| | Operational mode 1 | | Operational mode 2 | | | Operational mode 3 |

- Functional block may be a group of instances;
- Pij represent power numbers, where i = 1,2,3, j = 1,2,3,4
- Operational mode may be a power mode, or an event/trigger related to a selected time window.

FIG. 10    Instances power consumption table

| instance 1 | P11 | P12 | P13 | P14 | P15 | P16 |
|---|---|---|---|---|---|---|
| instance 2 | P21 | P22 | P23 | P23 | P23 | P26 |
| instance 3 | P31 | P32 | P33 | P34 | P35 | P36 |
| instance 4 | P41 | P42 | P43 | P44 | P45 | P46 |
| | segment1 | segment2 | segment3 | segment4 | segment5 | segment6 |
| | Operation mode 1 | | Operational mode 2 | | | Operational mode 3 |

- instance i may be a sub-instance of instance j where i > j
- Pij represent power numbers; where i = 1,2,3, j = 1,2,3,4
- Operational mode may be a power mode, or an event/trigger related to a selected time window.

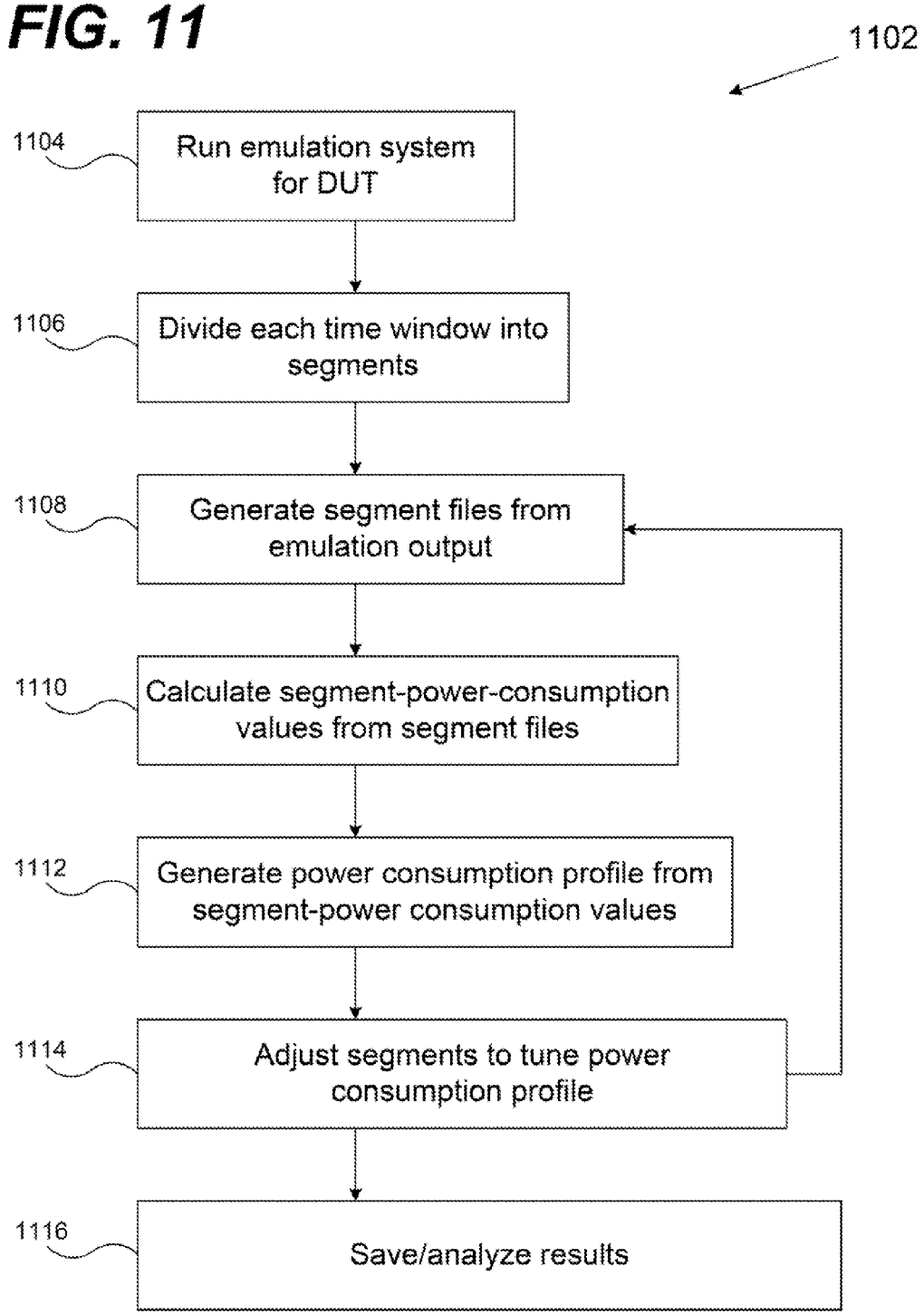

```
   dut
      alarmClock
      calendar
      camera
      game
      mediaPlayer
      musicPlayer
      phoneCall
      radio
      video
```

```
ModeName powerMode

OptMode [0 999]     StandBy
OptMode [1000 3047] Media
OptMode [3048 5095] PhoneMedia
OptMode [5096 7143] Media
OptMode [7144 9191] PhoneMedia
OptMode [9192 9999] Media
OptMode [10000 13999] StandBy
OptMode [14000 16047] Media
OptMode [16048 18095] PhoneMedia
OptMode [18096 18999] Media
OptMode [19000 19999] StandBy
```

```
Segment [0 999]       Duration 1000 ToggleRate 1.00  HighRate 73.50
Segment [1000 1099]   Duration 100  ToggleRate 4.33  HighRate 79.12
Segment [1100 1199]   Duration 100  ToggleRate 4.86  HighRate 88.68
Segment [1200 1299]   Duration 100  ToggleRate 5.51  HighRate 97.04
Segment [1300 1399]   Duration 100  ToggleRate 3.83  HighRate 99.38
Segment [1400 1499]   Duration 100  ToggleRate 6.34  HighRate 97.84
Segment [1500 1599]   Duration 100  ToggleRate 8.51  HighRate 108.78
Segment [1600 1699]   Duration 100  ToggleRate 11.37 HighRate 111.16
Segment [1700 1799]   Duration 100  ToggleRate 10.99 HighRate 114.40
Segment [1800 1899]   Duration 100  ToggleRate 10.32 HighRate 118.48
Segment [1900 1999]   Duration 100  ToggleRate 11.21 HighRate 116.80
Segment [2000 2999]   Duration 1000 ToggleRate 13.31 HighRate 123.10
Segment [3000 3999]   Duration 1000 ToggleRate 12.01 HighRate 119.17
Segment [4000 4999]   Duration 1000 ToggleRate 16.23 HighRate 130.68
Segment [5000 5999]   Duration 1000 ToggleRate 11.02 HighRate 115.95
Segment [6000 6999]   Duration 1000 ToggleRate 15.90 HighRate 129.94
Segment [7000 7999]   Duration 1000 ToggleRate 15.10 HighRate 126.95
Segment [8000 8999]   Duration 1000 ToggleRate 18.98 HighRate 138.20
Segment [9100 9109]   Duration 10   ToggleRate 18.30 HighRate 145.10
Segment [9110 9119]   Duration 10   ToggleRate 21.30 HighRate 147.90
Segment [9120 9129]   Duration 10   ToggleRate 34.60 HighRate 152.90
Segment [9130 9139]   Duration 10   ToggleRate 18.90 HighRate 143.70
Segment [9140 9149]   Duration 10   ToggleRate 21.40 HighRate 148.50
Segment [9150 9159]   Duration 10   ToggleRate 30.30 HighRate 154.30
Segment [9160 9169]   Duration 10   ToggleRate 28.70 HighRate 152.90
Segment [9170 9179]   Duration 10   ToggleRate 21.00 HighRate 157.70
Segment [9180 9189]   Duration 10   ToggleRate 20.30 HighRate 165.30
Segment [9190 9199]   Duration 10   ToggleRate 21.90 HighRate 124.30
Segment [9100 9199]   Duration 100  ToggleRate 22.10 HighRate 149.26
Segment [9200 9299]   Duration 100  ToggleRate 5.01  HighRate 110.08
Segment [9300 9399]   Duration 100  ToggleRate 5.19  HighRate 99.38
Segment [9400 9499]   Duration 100  ToggleRate 5.76  HighRate 101.56
Segment [9500 9599]   Duration 100  ToggleRate 3.98  HighRate 102.92
Segment [9600 9699]   Duration 100  ToggleRate 6.69  HighRate 102.60
Segment [9700 9799]   Duration 100  ToggleRate 8.92  HighRate 113.74
Segment [9800 9899]   Duration 100  ToggleRate 12.03 HighRate 114.92
Segment [9900 9999]   Duration 100  ToggleRate 10.62 HighRate 118.52
Segment [10000 13999] Duration 4000 ToggleRate 1.09  HighRate 95.50
Segment [14000 14999] Duration 1000 ToggleRate 7.40  HighRate 106.03
Segment [15000 15999] Duration 1000 ToggleRate 13.31 HighRate 123.10
```

FIG. 12F

```
tcffile () {
    tcfversion      :   "1.0" ;
    generator       :   "Palladium IXES.2 TCF Writer"" ;
    genversion      :   "1.0" ;
    type            :   "master" ;
    #maximum ID = 328 minimum ID = 64 ;
    delimiter       :   "/" ;
/* top cell scope: testbench */
    source          :   "gate-level" ;
    date            :   "Thu Apr 17 17:25:40 2008" ;
    duration        :   "200" ;

/* segment at [0 199] with length 200*/
    unit            :   "1ns" ;
    instance () {

/* instance dut */
        pin () {

/* begin input pins */
            "ce[0]"         :   64 ;
            "ce[1]"         :   65 ;
            "ce[2]"         :   66 ;
            "ce[3]"         :   67 ;
            "count_ce[0]"   :   101 ;
            "count_ce[1]"   :   102 ;
            "count_ce[2]"   :   103 ;
            "count_ce[3]"   :   104 ;
            "mem_addr[0]"   :   64 ;
            "mem_addr[10]"  :   104 ;
            "mem_addr[11]"  :   145 ;
            "mem_addr[1]"   :   65 ;
            "mem_addr[2]"   :   66 ;
            "mem_addr[3]"   :   67 ;
            "mem_addr[4]"   :   146 ;
            "mem_addr[5]"   :   147 ;
            "mem_addr[6]"   :   148 ;
            "mem_addr[7]"   :   101 ;
            "mem_addr[8]"   :   102 ;
            "mem_addr[9]"   :   103 ;
            "mem_din[0]"    :   64 ;
            "mem_din[10]"   :   103 ;
            "mem_din[11]"   :   104 ;
```

FIG. 12G

```
tcffile () {
    tcfversion      :   "1.0" ;
    generator       :   "Palladium IXE5.2 TCF Writer" ;
    genversion      :   "1.0" ;
    type            :   "slave " ;
    delimiter       :   "/" ;
/* top cell scope: testbench */
    source          :   "gate-level" ;
    data            :   "Thu Apr 17 17:25:41 2008" ;
    duration        :   "200" ;
                        ;
/* segment at [1800 1999] with length 200 */
    unit            :   "1ns" ;
    instance () {
        pin () {
"64"    :       "0.500000 100" ;
"65"    :       "0.500000 50" ;
"66"    :       "0.480000 25" ;
"67"    :       "0.480000 13" ;
"68"    :       "0.500000 200" ;
"69"    :       "0.500000 100" ;
"70"    :       "0.500000 50" ;
"71"    :       "0.480000 25" ;
"72"    :       "0.480000 13" ;
"73"    :       "0.520000 7" ;
"74"    :       "0.520000 3" ;
"75"    :       "0.520000 1" ;
"76"    :       "1.000000 0" ;
"77"    :       "0.000000 0" ;
"78"    :       "0.000000 0" ;
"79"    :       "0.000000 0" ;
"80"    :       "0.000000 0" ;
"81"    :       "0.000000 0" ;
"82"    :       "0.000000 0" ;
"83"    :       "0.000000 0" ;
"84"    :       "0.000000 0" ;
"85"    :       "0.000000 0" ;
"86"    :       "0.000000 0" ;
"87"    :       "0.000000 0" ;
"88"    :       "0.000000 0" ;
"89"    :       "0.000000 0" ;
"90"    :       "0.000000 0" ;
"91"    :       "0.000000 0" ;
"92"    :       "0.000000 0" ;
"93"    :       "0.000000 0" ;
```

FIG. 12H

```
(SAIFILE
(SAIFVERSION "2.0")
(DIRECTION "backward")
(DESIGN "testbench")
(DATE "Fri Apr 18 16:16:08 2008)
(VENDOR "Cadence Design System Inc.")
(PROGRAM_NAME "Palladum IXE5.2 SAIF Writer")
(PROGRAM_VERSION "0.1")
(DIVIDER .)
(TIMESCALE "1 ns")
(DURATION "1000")

/* segment at [7000 7999] with length 1000 */
(INSTANCE testbench
    (INSTANCE dut
        (PORT
            (ce[0] (T0 500) (T1 500) (TC 500)
            (ce[1] (T0 500) (T1 500) (TC 250))
            (ce[2] (T0 504) (T1 496) (TC 125))
            (ce[3] (T0 496) (T1 504) (TC 63))
            (clk (T0 500) (T1 500) (TC 1000))
            (count0[0] (T0 756) (T1 244) (TC 244))
            (count0[1] (T0 756) (T1 244) (TC 122))
            (count0[2] (T0 760) (T1 240) (TC 61))
            (count0[3] (T0 752) (T1 248) (TC 31))
            (count0[4] (T0 760) (T1 240) (TC 15))
            (count0[5] (T0 768) (T1 232) (TC 8))
            (count0[6] (T0 744) (T1 256) (TC 4))
            (count0[7] (T0 768) (T1 232) (TC 2))
            (count0[0] (T0 928) (T1 72) (TC 73))
            (count0[1] (T0 928) (T1 72) (TC 37))
            (count0[2] (T0 928) (T1 72) (TC 19))
            (count0[3] (T0 920) (T1 80) (TC 10))
            (count0[4] (T0 920) (T1 80) (TC 5))
            (count0[5] (T0 920) (T1 80) (TC 3))
            (count0[6] (T0 872) (T1 128) (TC 2))
            (count0[7] (T0 856) (T1 144) (TC 1))
            (count0[0] (T0 572) (T1 428) (TC 427))
            (count0[1] (T0 572) (T1 428) (TC 213))
            (count0[2] (T0 576) (T1 424) (TC 106))
```

FIG. 12I

PEAK POWER DETECTION IN DIGITAL DESIGNS USING EMULATION SYSTEMS

CROSS-REFERENCE TO RELATED APPLICATIONS

This application claims the benefit of U.S. Provisional Application No. 61/048,000, filed Apr. 25, 2008, and incorporated herein by reference in its entirety.

BACKGROUND OF THE INVENTION

1. Field of Invention

The present invention relates generally to design verification systems for integrated circuits (ICs) and more particularly to the use of hardware-based functional verification systems such as hardware logic emulation or simulation acceleration systems for detecting and analyzing peak power windows.

2. Description of Related Art

Design engineers typically rely on EDA (Electronic Design Automation) tools to develop complex integrated circuits. These EDA tools include a number of hardware-based functional verification systems including logic emulation systems and simulation accelerators. For simplicity these tools will be referred to collectively as emulation systems in the subsequent discussion.

Emulation systems can be used to verify the functionalities of electronic logic designs prior to fabrication of chips or electronic systems. Typical emulation systems utilize either interconnected FPGA (Field Programmable Logic Array) chips or interconnected processor chips. Exemplary hardware logic emulation systems with FPGA devices are described, for example, in U.S. Pat. Nos. 5,109,353, 5,036,473, 5,475,830 and 5,960,191, and exemplary hardware logic emulation systems with processor chips are described, for example, in U.S. Pat. Nos. 5,551,013, 6,035,117 and 6,051,030. Each of these patents is incorporated herein by reference in its entirety.

In general, a DUT (Device Under Test) may include an IC or a more complex electronic system. In the case where the DUT corresponds to an IC, it is usually represented in the form of either an RTL (Register Transfer Level) description or a gate level netlist. The gate level netlist may have been derived from RTL sources, including from a hardware description language (HDL), such as Verilog or VHDL (VHSIC (Very High Speed Integrated Circuit) HDL), using a synthesis method. Both RTL and gate level netlists are descriptions of the circuit's components and electrical interconnections between the components, where these components include all logic circuit elements, such as combinatory logic (e.g., gates) and sequential logic (e.g., flip-flops and latches), necessary for implementing a logic circuit.

Emulation systems have certain advantages over software simulation tools, which are typically used to verify block-level models of a user's design. Software simulators run on a computer system or workstation, typically in serial operations with a single or a small number of CPUs (Central Processing Units). In contrast, emulation systems have dedicated hardware that will perform the designed functions in parallel. This massive parallelism enables an emulation system to operate at a speed that is orders of magnitude faster than a software simulator. Because emulators can operate so much faster than simulators, they can perform functional verification much faster. For example, an emulator can execute thousands of clock cycles of a DUT in a few milliseconds. Thus, in the same amount of time an emulator executes millions of clock cycles, a software simulator might only have simulated the execution of a few or even just a fraction of a clock cycle. In fact, emulators can operate at speed fast enough to allow the intended application software to run on the prototype system, which is something the software simulator can never accomplish.

Another advantage of emulation systems over software simulators is their ability to operate "in circuit." Operating "in circuit" refers to an emulator's ability to operate in the actual hardware that the DUT being emulated will eventually be installed into once the chip has been fabricated. This actual hardware is sometimes referred to as the "target system." For example, the designer of a microprocessor might emulate the microprocessor design. Using cables connecting the emulator to the motherboard of a personal computer, the emulator can be used in lieu of the actual microprocessor. The ability to operate in circuit provides many advantages. One of them is that the designer can see how their design functions in the actual system in which the DUT will eventually be installed. Another advantage is that in circuit emulation allows software development to take place before the IC chip is fabricated. Thus, the emulator can emulate the IC in the target system while the design team writes and tests firmware or other application software.

Integrated circuits designed for low-power applications (e.g., for wireless and portable electronics) have additional challenges for design verification including minimizing power dissipation, designing efficient packaging and cooling systems for high-power integrated circuits, and verifying functionalities of low-power or no power situations early in the design. These power management issues have become even more critical in view of the continuous shrinking of device dimensions with the advancement of semiconductor processing technology.

However, conventional emulation systems have not responded to these challenges. One reason is that existing power optimization and implementation techniques are typically applied at the physical implementation phase of the design process (e.g., after circuit synthesis). These power management design techniques may significantly change the design constraints, yet none of the intended behavior can be captured in the RTL of the design. This deficiency creates a gap in the RTL to Graphic Data System II (GDSII) implementation and verification flow where the original RTL can no longer be relied upon as a complete representation of the design, and thus cannot be used to verify the final netlist implementation containing power management implementations.

With higher levels of integration, power estimation has become an increasingly critical issue for chip design, especially for low-power designs. See, for example, patent application US 2006/0277509 A1, published Dec. 7, 2006, which is incorporated herein by reference in its entirety. Identifying all high power consumption scenarios is a challenging task in power analysis. However, conventional power analysis tools, which usually base their power calculations on design activity files with common formats such as TCF (Toggle Count Format) or SAIF (Switching Activity Interchange Format), typically report only the average power consumption for a given time period. Additionally, power analysis tools based on VCD (Value Change Dump) for calculating peak power values are usually time-consuming and often not practical for large complex designs, particularly when applied to relatively long test sequences that replicate conditions for the final silicon. Thus, conventional approaches have not adequately enabled hardware-based verification of critical power management functions such as power estimation and peak power detection.

Thus there is a need for improved emulation systems for detecting and analyzing peak power windows of IC designs.

SUMMARY OF THE INVENTION

In one embodiment of the present invention, a method of analyzing power consumption for a DUT (device under test) that includes an integrated circuit or an electronic system includes: providing emulation data for states of the DUT in one or more time windows; determining operational mode values from the emulation data and a selection of operational modes that characterize circuit behavior in the one or more time windows; dividing each time window into one or more segments based on at least one power criterion; determining power-activity values for one or more of the segments; determining power-consumption values for the one or more segments from the power-activity values; using the power-activity values and the power-consumption values to determine relative power activity across the one or more segments and adjusting the one or more segments to target high power activity over operational modes in the one or more time windows; and saving one or more values for power activity of the DUT in a computer-readable medium.

According to one aspect of this embodiment, providing the emulation data may include using an emulation system to determine operations of the DUT in the one or more time windows, wherein the emulation system includes a combination of hardware and software for characterizing states of the DUT in the one or more time windows.

According to another aspect, the operational mode values may correspond to power usage for the DUT, and dividing each time window into the one or more segments may include dividing each time window into the one or more segments based on operational mode transitions of the DUT.

According to another aspect, the power-activity values may include values for at least one of an unweighted toggle count profile, a weighted toggle count profile, or a duty count profile for selected nodes of the DUT, wherein weights for the weighted toggle count profile are calculated from power models for nodes of the DUT. For example, the selected nodes may include all nodes of the DUT as well as a smaller subset.

According to another aspect, determining the power-consumption values may include generating a waveform or tabular representation of a power-consumption profile for each of the one or more segments.

According to another aspect, adjusting the one or more segments may include filtering out at least one segment based on relatively low values for toggle counts or duty counts. Note that the toggles counts may be weighted or unweighted.

According to another aspect, adjusting the one or more segments may include at least one of using a coarser resolution for portions of the time window with relatively low values for toggle counts or duty counts, and using a higher resolution for portions of the time window with relatively high values for toggle counts or duty counts. Note that the toggles counts may be weighted or unweighted.

According to another aspect, adjusting the one or more segments may include using a finer resolution for portions of each time window with high power consumption values.

According to another aspect, the method may further include: determining power-activity values for the adjusted one or more segments; determining power-consumption values for the adjusted one or more segments from the power-activity values; and saving one or more values for the power-activity values and the power-consumption values of the adjusted one or more segments in the computer readable medium.

According to another aspect, the method may further include: identifying one or more peak-power segments from the adjusted one or more segments, wherein each peak-power segment characterizes a peak power consumption across the one or more time windows; identifying one or more nodes of the DUT with high power consumption in the one or more peak-power segments, and saving one or more values for the one or more peak-power segments in the computer-readable medium.

Additional embodiments relate to an apparatus for carrying out any one of the above-described methods, where the apparatus includes a computer for executing instructions related to the method. For example, the computer may include a processor with memory for executing at least some of the instructions. Additionally or alternatively the computer may include circuitry or other specialized hardware for executing at least some of the instructions. Additional embodiments also relate to a computer-readable medium that stores (e.g., tangibly embodies) a computer program for carrying out any one of the above-described methods with a computer. In these ways the present invention enables improved emulation systems for detecting and analyzing peak power windows of IC designs.

BRIEF DESCRIPTION OF THE DRAWINGS

FIG. 3 shows further details related to the offline mode in the embodiment shown in FIG. 1.

FIG. 4A shows further details related to the offline mode in the embodiment shown in FIG. 1.

FIG. 4C shows further details related to the offline mode in the embodiment shown in FIG. 1.

FIG. 9 shows functional blocks power consumption table.

FIG. 10 shows instances power consumption table.

FIG. 11 show a method for detecting peak power windows according to an embodiment of the present invention.

FIGS. 12A-12J show details for a specifically preferred embodiment related to the embodiment shown in FIG. 11.

DETAILED DESCRIPTION OF EXEMPLARY EMBODIMENTS

Figure 1:
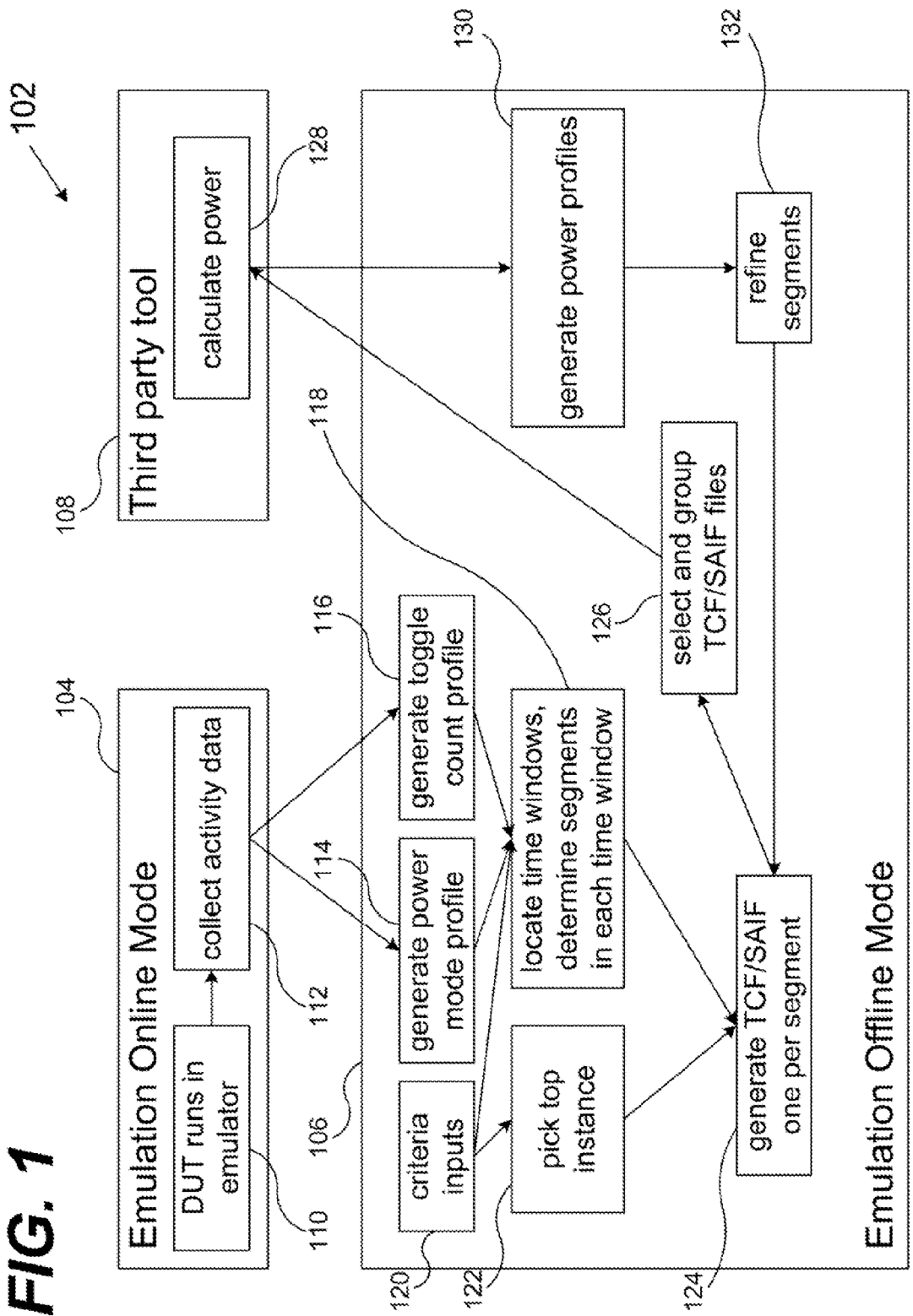
FIG. 1 shows structural details for a method of dynamic power analysis in an emulation system according to an embodiment of the present invention.

FIG. 1 shows structural details for a method 102 of dynamic power analysis in an emulation system according to an embodiment of the present invention. Steps or aspects of the method 102 are separated into phases of operation including an emulation online mode 104, an emulation offline mode 106, and external or third-party tools 108 for power calculations.

The third-party tools 108 can operate according to standard models for power consumption. In general, the total chip power consumption is the sum of internal power and leakage power for all the instances and all the net power:

$$P_{total} = \sum_{i}^{n} P_{internal} + \sum_{i}^{n} P_{leakage} + \sum_{i}^{m} P_{net} \qquad (1)$$

The internal power consumption of each component can be calculated based on models (e.g., from a technology library) and switching activity captured by TCF (Toggle Count Format) or SAIF (Switching Activity Interchange Format) data:

$$P_{internal} = \sum_{per\_arc} (TR_{arc_{ij}} \times \Phi(S_i, C_j)) + \sum_{per\_pin} (TRi \times \Phi(S_i)) \qquad (2)$$

In this formula, TR is the effective toggle rate of an arc or a pin. The effective toggle rate of $arc_{ij}$ depends on the probability that the arc will be activated and on the toggle rate on input pin i. The probability that the arc will be activated is determined by the function of output pin j and the probabilities of the other input pins. One or more power functions $\Phi$ can be obtained from the energy table in the technology library with values dependent on $S_i$, the slew of input i causing a toggle on output j, and $C_j$, the load capacitance of the output j.

The leakage power can be expressed as:

$$P_{leakage} = \sum_{state=1}^{k} (P_{state\_leakage} \times prob_{state}) \qquad (3)$$

In this formula k is the number of states associated with a cell, $P_{state\_leakage}$ is the leakage of the cell in that state, and $prob_{state}$ is the probability that cell is in duty count state (e.g., logic state of "1").

The net power can be expressed as:

$$P_{net} = \frac{1}{2} \times C_L \times V^2 \times TR \qquad (4)$$

In this formula $C_L$ is the capacitance in femto-farads (by default), and V is the supply voltage in Volts. The capacitance is the sum of the capacitances of the net and of the input pins driven by the net. This information is typically stored in a related technology library. The user can change this parameter either by changing the operating corners or overwrite it directly inside the third-party calculation tool. The variable TR is the toggle rate, which can be calculated by dividing the toggle count by the simulation period annotated in the TCF or SAIF file(s). In general, the toggle count is a running sum of toggles between states (e.g., between logic '0' and logic '1') for a given duration (e.g., number of clock cycles). The duty count is a running sum of threshold or active states (e.g., logic '1') for a given duration (e.g. number of clock cycles).

In the online mode 104, a DUT runs in the emulator 110, and values from the resulting activity data are stored 112.

In the offline mode 106, values from the activity data are used for generating power mode profiles 114 and generating toggle count profiles 116. In general, a power mode is an operational mode that corresponds to a static state of the circuit where each node operates on a specific power supply. The toggle count profiles may be weighted or unweighted. These profiles are analyzed to locate time windows and determine segments in each time window 118. Criteria inputs 120 such as least toggle count threshold and number of segments in special power modes will help to locate time windows and determine segments in each time window 118. Criteria inputs 120 such as DUT top cell and instance name will help to determine the top instance 122 that will be used in TCF/SAIF files. Values for TCF/SAIF files are generated for each segment 124. The TCF/SAIF files are selected and grouped 126 and these values are sent to the third party tools 108 that calculate power values 128 for generating power profiles 130. Segments can be refined 132 and the process can be continued with the generation of additional TCF/SAIF files for the new segments 124.

The format of the data storage may vary according to the requirements of the operational setting. Typically in the online mode 104, two types of files will be generated: .phy files and .tc files. In the offline mode 106, toggle count profiles for a given set of instances or functional blocks can be generated based on the .tc files, and power mode profiles can be generated in text format, or waveform based on the .phy files. Based on toggle count profile, power mode profile, a segment log file can be generated.

Further, in the offline mode 106, segment log files and TCF/SAIF toggle count profiles can be generated in text format or waveform format (e.g., SimVision SST2or Debussy FSDB). And the segment log file can be updated. Based on the updated segment log files, TCF/SAIF files can be collected or generated from .phy files. And then the TCF/SAIF files will be passed to a third party tool for power calculation. The power consumption profile can be generated in text format, or waveform format based on the segment log files and power reports from the third party tools 108.

Figure 2:
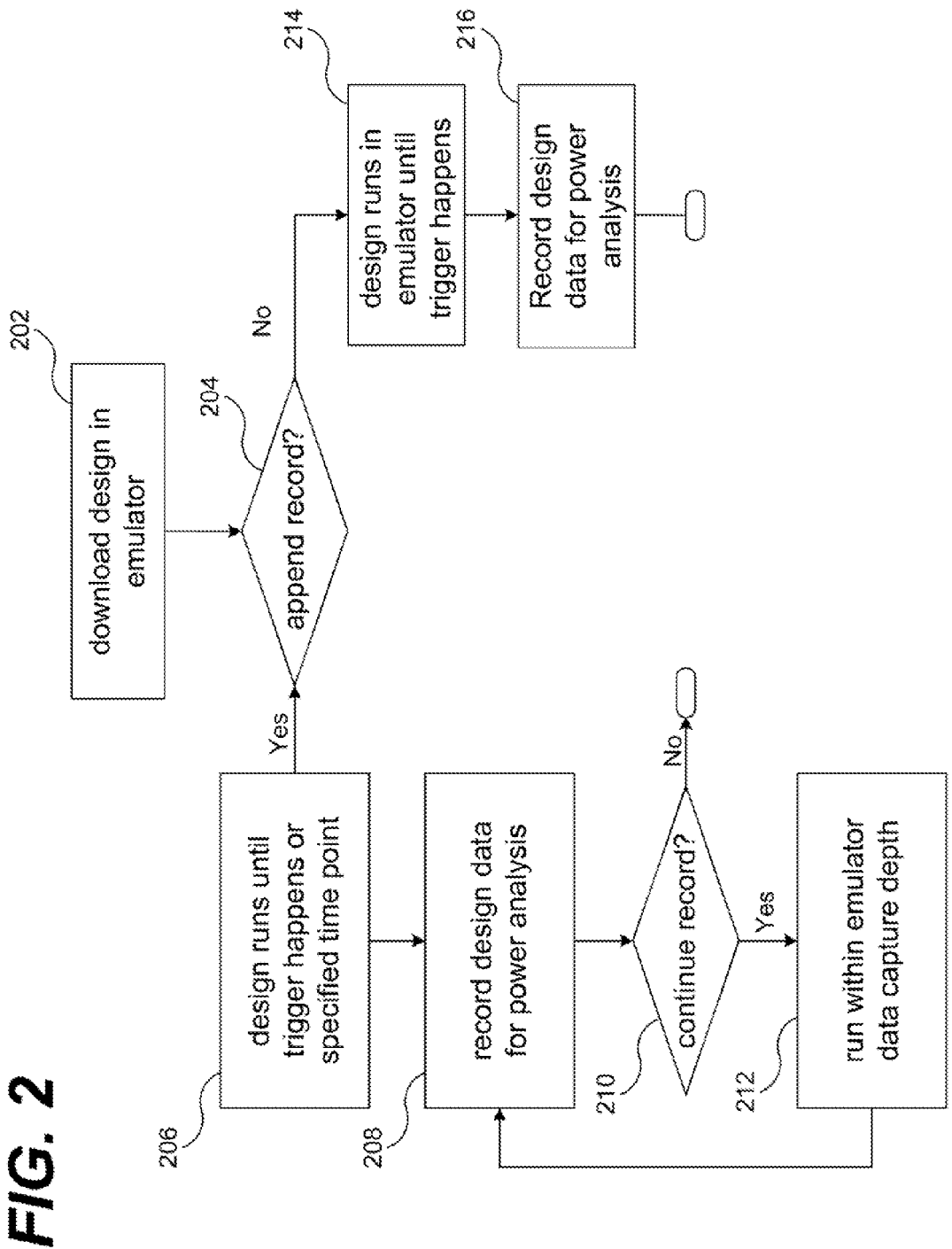
FIG. 2 further details related to the online mode in the embodiment shown in FIG. 1.

FIG. 2 shows further detail for the online mode 104 including the collection of activity data. In general, there are two ways to collect data over a time span: one is recording once when a trigger happens; the other is recording multiple times to expand coverage to a very long time. As shown in FIG. 2, the design is downloaded into the emulator 202 and a decision is made whether or not to append records for data collection 204. If the decision is not to append records, then the design runs in the emulator until the trigger happens 214 and design data is recorded for power analysis 216. Alternatively, if the decision is to append records, then the design runs until the trigger happens or some specified time point 206. Then design data is recorded for power analysis 208. This process is continued with a sequential decision on whether to continue recording 210 and running the emulator to the appropriate data capture depth 212.

FIG. 3 shows further detail for the offline mode 106 including the use of three filters to detect peak powers automatically. First the top instance is specified 302. The first filter includes generating toggle count profiles 304 and generating power mode profiles 306.

The second filter includes choosing an instance and power report depth 308 and specifying windows and segment divisions 310. Based on user selectable toggle count thresholds, the time windows of interest and possible segments in each time window can be determined. For each possible segment, the total toggle counts and duty counts of all pins or nets that may appear in the TCF/SAIF file are calculated. The TCF/SAIF toggle count profile includes the toggle count rate (e.g., the total of all toggle counts of pins/nets in TCF/SAIF divided by segment duration per segment) and duty count rate (e.g., the total of all '1' cycle counts of pins/nets in TCF/SAIF divided by segment duration per segment) for each possible segment. Segments can be chosen for power calculation from potential segments set by analyzing TCF/SAIF toggle count profiles. Then TCF/SAIF files are generated for each selected segment 312.

The third filter includes operations for refining the resolutions for higher power consumption segments based on the power profile. This includes reporting powers for given instances and depths 314, and generating power profiles including waveforms and tables 316. Then the refinement can include changing the instance 318 or changing time windows and segment divisions 320.

The three levels of time-segment filtering shown in FIG. 3, can be employed to weed out the non-essential computation. The first filter is based on the design toggle-count profile 304 and the operational mode such as power mode profile 306. The time windows can be filtered out if there are not significant toggle activities during those time windows. The time windows with un-important operational modes also can be filtered out. The second filter is based on the TCF/SAIF toggle-count/duty-count waveform 312. The segments in the time windows will be adjusted. The coarse-grained resolution will be applied to those segments with low TCF/SAIF toggle counts, while the finer resolution will be given to those segments with high TCF/SAIF toggle counts. In this way the number of TCF/SAIF files can be controlled. Typically, this step will improve overall throughput since power calculation consumes much more time than TCF/SAIF files generation. The third filter is based on power consumption profile 316 including resolution refinement for the segments that have relatively high power consumption values. All three filtering processes can be applied to the whole DUT or block levels.

Advantageously, these filters can operate without re-running the emulation. Typically, the emulator is a precious resource that is usually shared by many users. Offline mode of operation 106 allows users to analyze toggle counts and power profiles while releasing emulator resources for other tasks. Depending on the requirements of the operational setting, a GUI (Graphical User Interface) can be provided to assist in the whole process.

FIG. 4A shows further detail for the offline mode 106 including steps for generating the toggle count profile. Instances can be specified (e.g., by instance number or instance name) 402. Then in each time window toggle counts per emulation clock cycle can be calculated for instances 404. Then toggle-count/duty-count profiles can be generated for selected instances 406. Additionally or alternatively, these profiles can be weighted based on power models from technology library files related to the DUT. That is, technology library files (e.g., .lib files) can be specified for the DUT 408. Corresponding power information can be determined from the technology library files, and weights can be calculated for the pins and pin-to-pin arcs 410. Then the weights can be used to adjust the toggle counts per emulation clock cycle 412 and profiles can be generated similarly 406.

As shown in FIG. 4A, there are two toggle count profiles, one is an un-weighted toggle count profile for given instances 402, the other is a weighted toggle count profile for given instances 408. The pure toggle count profile shows the total toggle counts and duty counts per clock cycle for given instances. Since the toggles in different instances affect the power consumption differently, weights can be assigned to pins and pin-to-pin arcs in each instance based on power information in the technology library files.

Figure 4B:
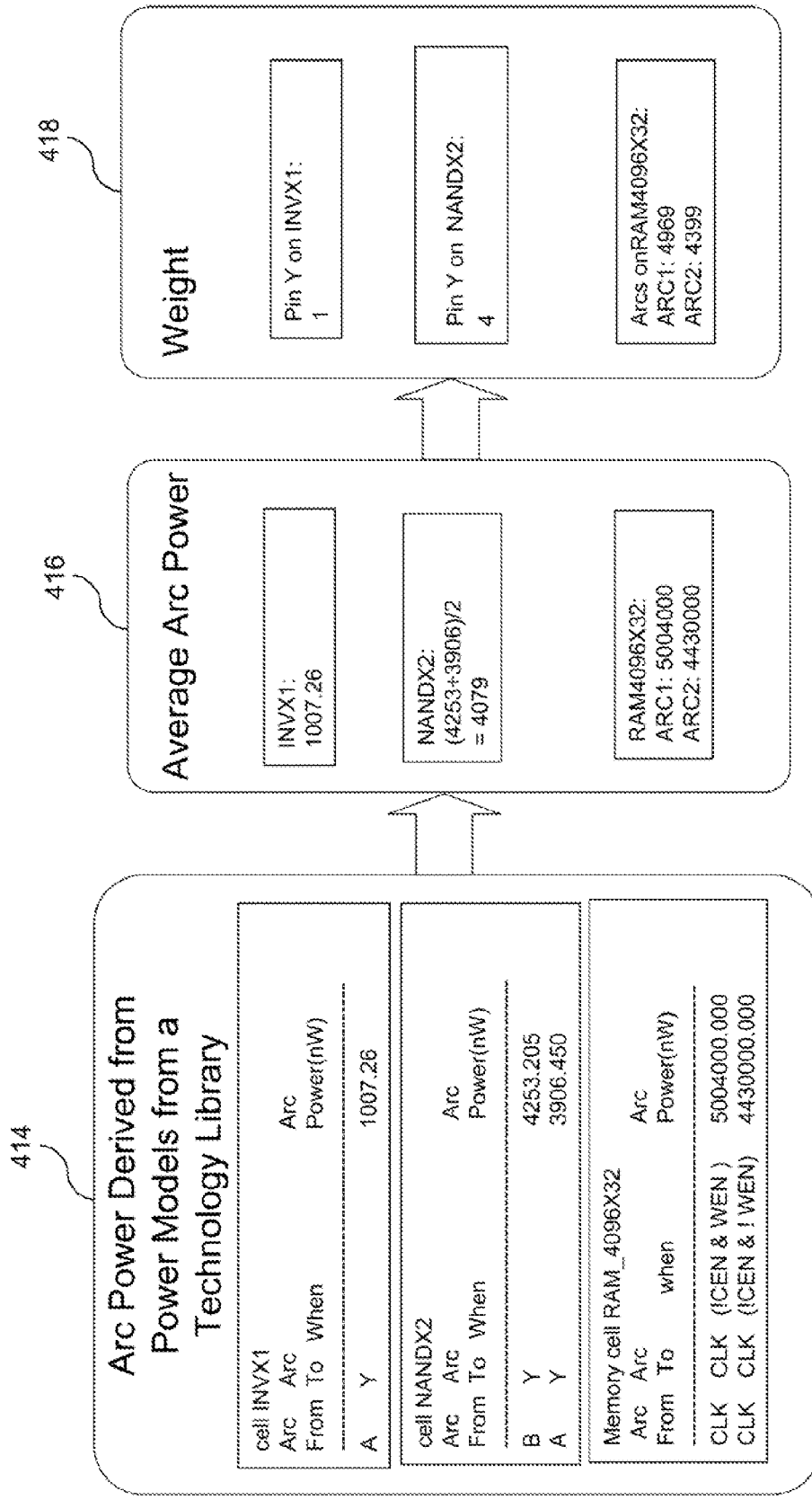
FIG. 4B shows further details related to the offline mode in the embodiment shown in FIG. 1.

FIG. 4B shows further detail for calculating the weights 410. First arc power is derived from power models from the technology library .lib files 414. Next average arc power is calculated 416. Then the weights are calculated 418. FIG. 4B illustrates a case with three cells: INVX1, NANDX2, and RAM_4096X32. Cell INVX1 has input pin A and output pin Y. The toggle of A will cause a toggle of Y, and when A toggles, the arc from A to Y consumes power equal to 1007.26 nW. Cell NANDX2 has input pins A and B, and output pin Y. When A toggles, the power in arc from A to Y is 3906.45 nW. When B toggles, the power in arc from B to Y is 4253.205 nW. Cell RAM_4096X32 is a memory cell with clock input given as CLK, enable given as CEN and write enable given as WEN. When the condition (!CEN&WEN) is true, the toggle of CLK causes power consumption equal to 5004000 nW; and when condition (!CEN&!WEN) is true, the toggle of CLK causes power consumption equal to 4430000 nW.

The weight can be assigned to an output pin or an pin-to-pin arc. Corresponding averages are shown 416 where the value for cell NANDX2 is calculated as an average of the two distinct arcs (B/Y, A/Y). Cell INVX1 has arc power equal to 1007.26 nW for its output pin Y; cell NANDX2 has arc power equal to (4253+3906)/2=4079 nW for its output pin Y; memory cell RAM4096X32 has arc power equal to 5004000 nW for ARC1 with condition (!CEN&WEN), and arc power equal to 4430000 nW for ARC2 with condition (!CEN&!WEN). For this embodiment, the weights 418 can be defined as the average arc power divided by the minimum average arc power for cells in the design. In this case, the minimum average arc power corresponds to cell INVX1. Then, INVX1 has weight equal to 1, NANDX2 has weight equal to 4, RAM4096X32 has weight equal to 4969 for condition (!CEN&WEN), and weight equal to 4399 for condition (!CEN&!WEN). (Here the weights have been rounded to integral values.)

FIG. 4C shows formulas for calculating the toggle counts 404. In the un-weighted case, the toggle count 420 is given by a sum of the number of pins toggling from 0 to 1 or from 1 to 0. The weighted toggle count 422 is given by a sum of the weighted number of pins toggling from 0 to 1 or from 1 to 0 plus a sum of the weighted number of active arcs. An arc is active when the "Arc From" pin toggles and the "Arc To" pin toggles and the "when" condition is true. Both pin weight and arc weight values can be calculated directly based on a cell's power model or an IP unit's power model. When the circuit runs, a pin may toggle or may not; an arc may be active or may not be. For a simple cell such as an ASIC cell, its weight is determined by its output pin weight. For a complex cell such as a memory cell or IP unit, its weight is determined by its arc weights. A circuit normally has a huge number of simple gates compared to the number of memory cells and IP units. Checking if an arc is active or not typically costs much more time as compared with checking if a pin toggles or not. The hybrid method of using pin weights and arc weights to generate a circuit's weighted toggle count profile typically has good performance while satisfying the relevant accuracy requirements. An un-weighted example 424 is shown where the toggle count is 2, and a weighted example 426 is shown where the weighted toggle count is 5.

Figure 5:
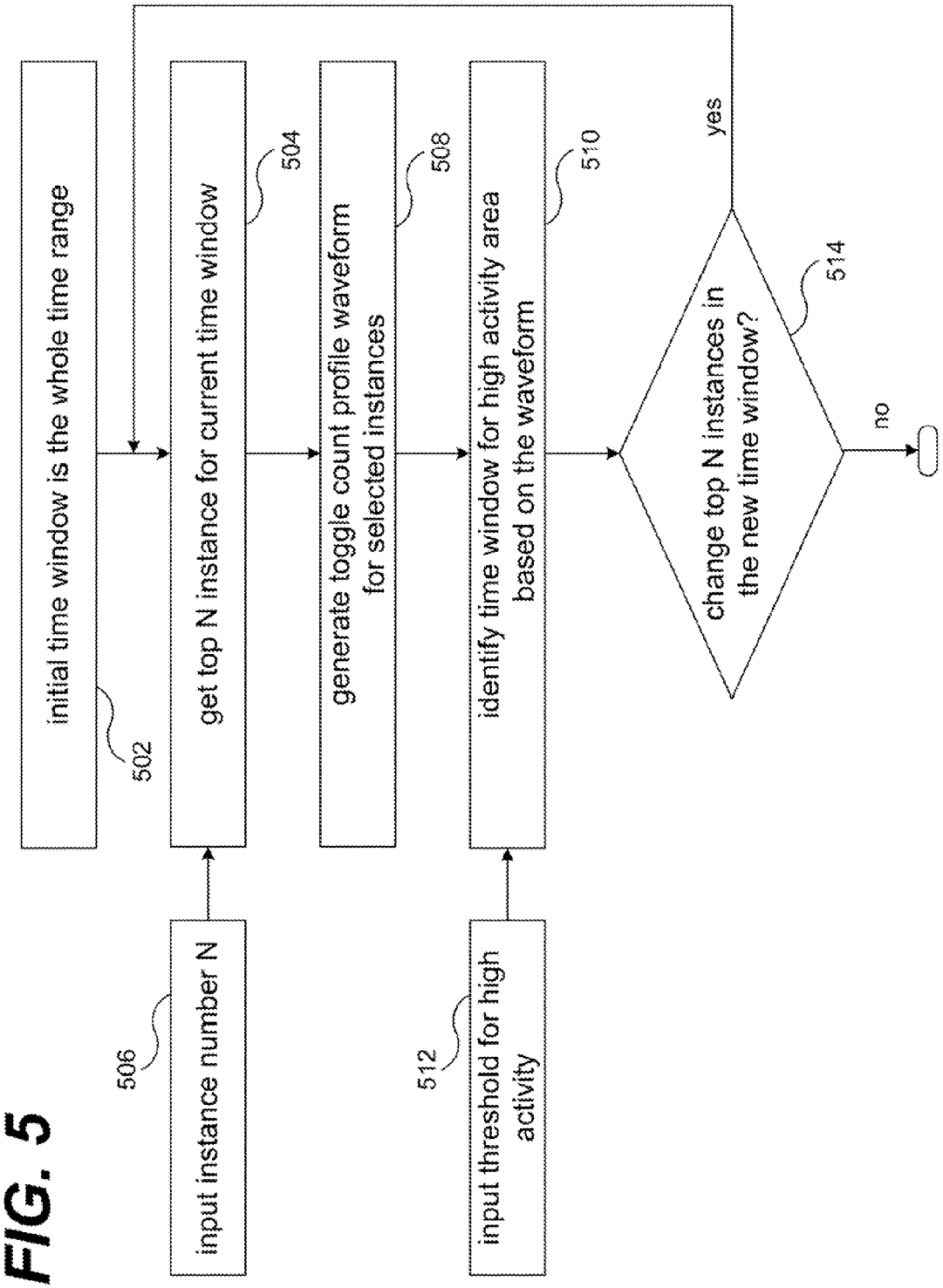
FIG. 5 shows further details related to the offline mode in the embodiment shown in FIG. 1.

FIG. 5 shows further detail for operations in the offline mode 106 for generating toggle count profiles 116, 304 and locating time windows 118, 306 including steps for identifying high activity instances and time windows based on toggle count profiles (e.g., as in operations related to choosing instances and power report depth 308 and specifying windows and segment divisions 310). The time window is first assumed to be the whole time range of toggle count profile 502. Then the software can pick up top N instances within the initial time window (e.g., sorted based on the number of corresponding nets) and generate waveforms for the selected instances 504 (e.g., based on an input 506). Then toggle count profile waveforms can be generated for the selected instances 508. Then software can identify high activity time window 510 based on the selected instances or a user specified threshold 512. The user can also manually select the time window by observing the toggle count profile waveform. Then optionally a user can select top N instances within the new time window and iterate through previous steps again to refine the selection 514.

Figure 6:
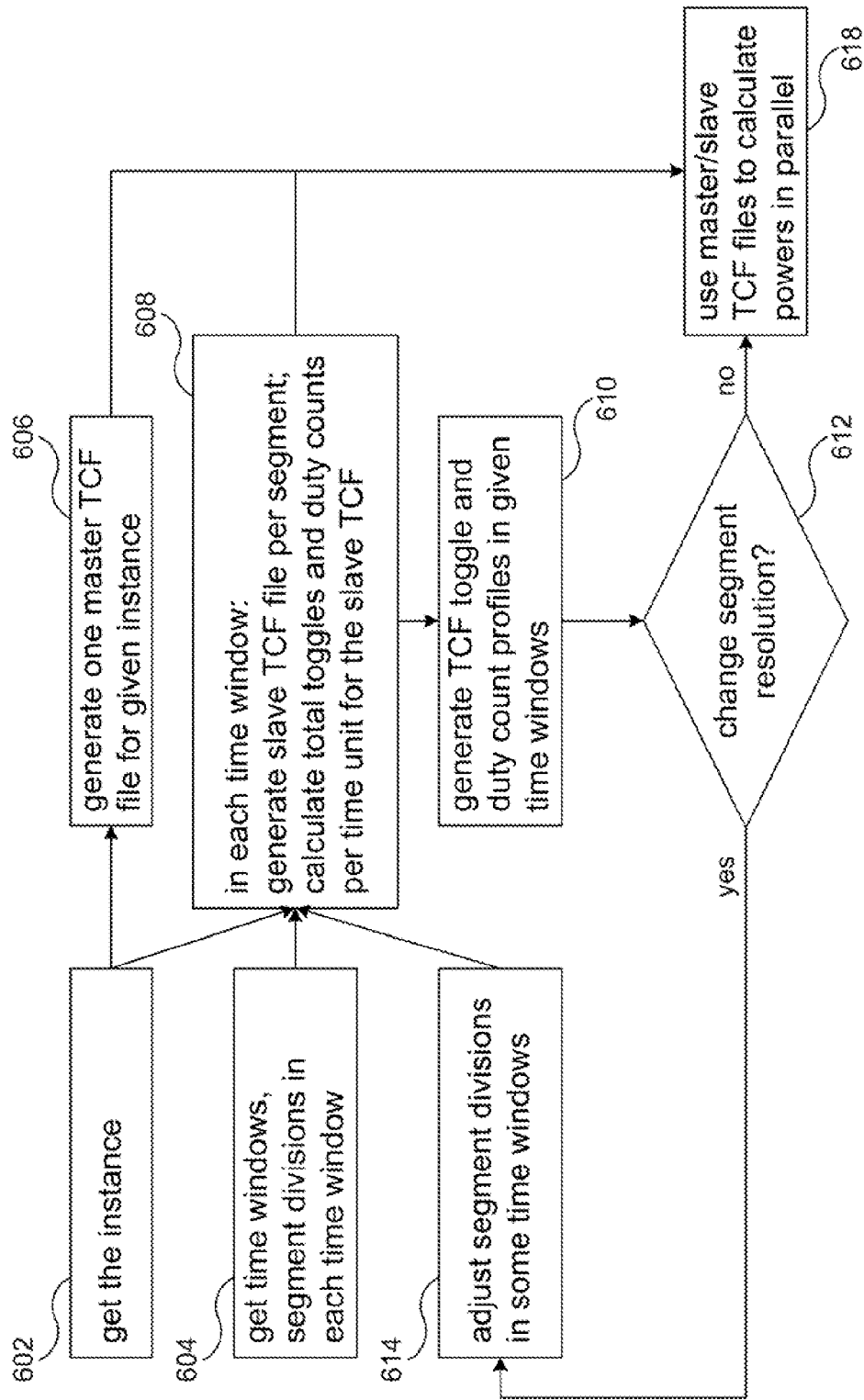
FIG. 6 shows further details related to the offline mode in the embodiment shown in FIG. 1.

FIG. 6 shows further details related to the offline mode 106 including steps for generating master/slave TCF files (e.g., as in operations related to generating TCF/SAIF files and TCF/SAIF toggle count waveforms 312). Initiating the process includes specifying the instance 602 and specifying the time windows and segment divisions in each time window 604. A master TCF file can be generated for the given instance 606. In each time window, a slave TCF file can be generated for each segment, and the toggle count rate, and duty count rate for the slave TCF file can be calculated 608. TCF toggle count rate and duty count rate waveforms can be generated in given time windows 610. The segment resolution can be changed 612 so that segment divisions are adjusted in some time windows 614. Finally, the master/slave TCF files can be used to calculate powers in parallel 618.

The development of master/slave TCF files as illustrated in FIG. 6 can substantially enhance data processing for emulation systems. Since emulation systems will generate many TCF files, the interface between emulation systems 110 and the third party power calculation tools 108 will be critical for throughput. The master TCF file has the design pins or nets hierarchy information, while slave TCF file has the pins or nets toggle counts and duty counts. With this, the power calculation tool needs to annotate the pins/nets hierarchy locations only once, thus saves computational time and disk space for the TCF files. For the whole design, only one master TCF is generated. One slave file is generated for each time segment. When toggle counts and duty counts for a slave TCF file are calculated, the total toggle counts and duty counts for the slave TCF file are also accumulated. Thus, once a slave TCF file is generated, its total toggle counts and duty counts are also available. When all slave TCF files are generated, the TCF toggle count profile is also available. Moreover, the TCF toggle count profile in waveform format will allow users to see the activities in all slave TCF files at a glance on the waveform graphic. Meanwhile software uses the TCF toggle count profile with threshold to adjust segment resolution. Preferably, the third party power estimation tools 108 can be invoked in parallel to calculate the powers per group of segments.

One approach to power management for low power designs has been the development of a Common Power Format (CPF), which enables designers to specify design intents such as power management information in a single file that can be shared by different design tools in the entire design flow, all the way from RTL (Register Transfer Level) to GDSII (Graphic Data System II) implementation. Consistent power management analysis can be maintained across relevant design stages including architecture exploration, logic design, verification, synthesis, physical implementation and signoff analysis. (Chi-Ping Hsu, "Pushing Power Forward with a Common Power Format—The Process of Getting it Right," *EETimes*, 5 Nov. 2006.)

With CPF, a design can be grouped into different power domains. Each power domain can be connected to a separate power supply with the same or different voltage. The state of all power domains determines the power mode of the whole design. The power mode waveform will be generated within the time windows. The user specifies the number of segments in each power mode. The number of segments can be zero or any positive integer. By default, one segment is set for each power mode.

Figure 7:
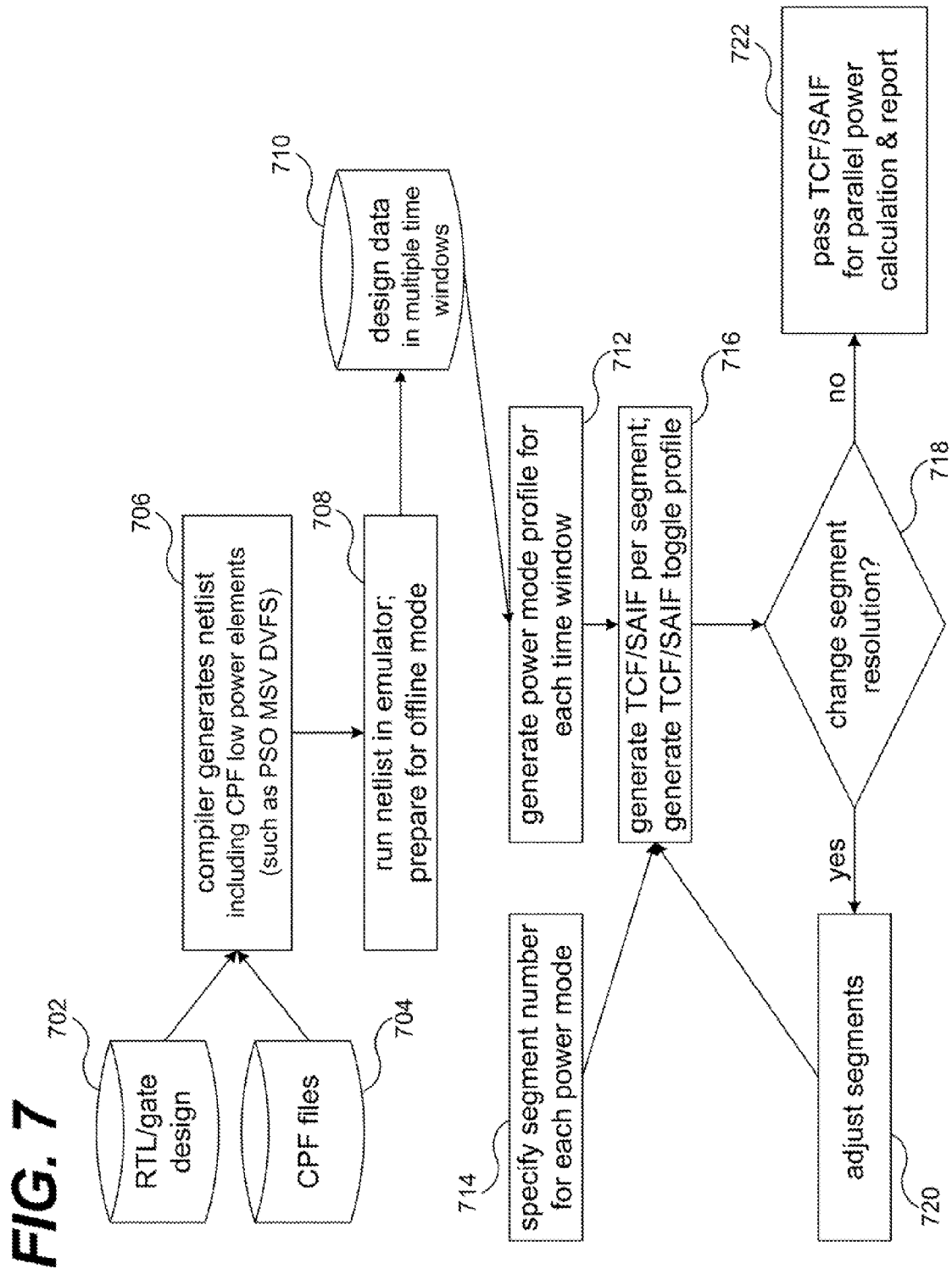
FIG. 7 shows further details related to the offline mode in the embodiment shown in FIG. 1.

FIG. 7 shows further details related to the offline mode 106 including steps for determining segment resolution based on power mode in a low-power design (e.g., as in operations related to changing time windows and segment divisions 320). Based on values from the RTL/gate design 702 and CPF files 704, a compile generates a netlist that includes CPF low-power elements 706 (e.g, Power Shutoff (PSO), Multiple Supply Voltage (MSV), Dynamic Voltage and Frequency Scaling (DVFS)). Then the netlist can be run in the emulator 708 and design data can be collected for multiple time windows 710 (e.g., in online mode 104) With this preparation for the offline mode 106, the power mode profile can be generated in each time window 712 (e.g., as in more general operations related to generating power mode profiles 306). With a specification of segment number for each power mode 714, TCF/SAIF files can be generated per segment and corresponding TCF/SAIF toggle count profiles can be generated 716 (e.g., as in more general operations related to generating TCF/SAIF files and toggle count waveforms 312). Similarly as in more general operations shown in FIGS. 1,3, and 6, segment resolution can be changed 718 with a corresponding adjustment of segments 720, and resulting TCF/SAIF files can be used for parallel power calculations and reports 722.

Figure 8:
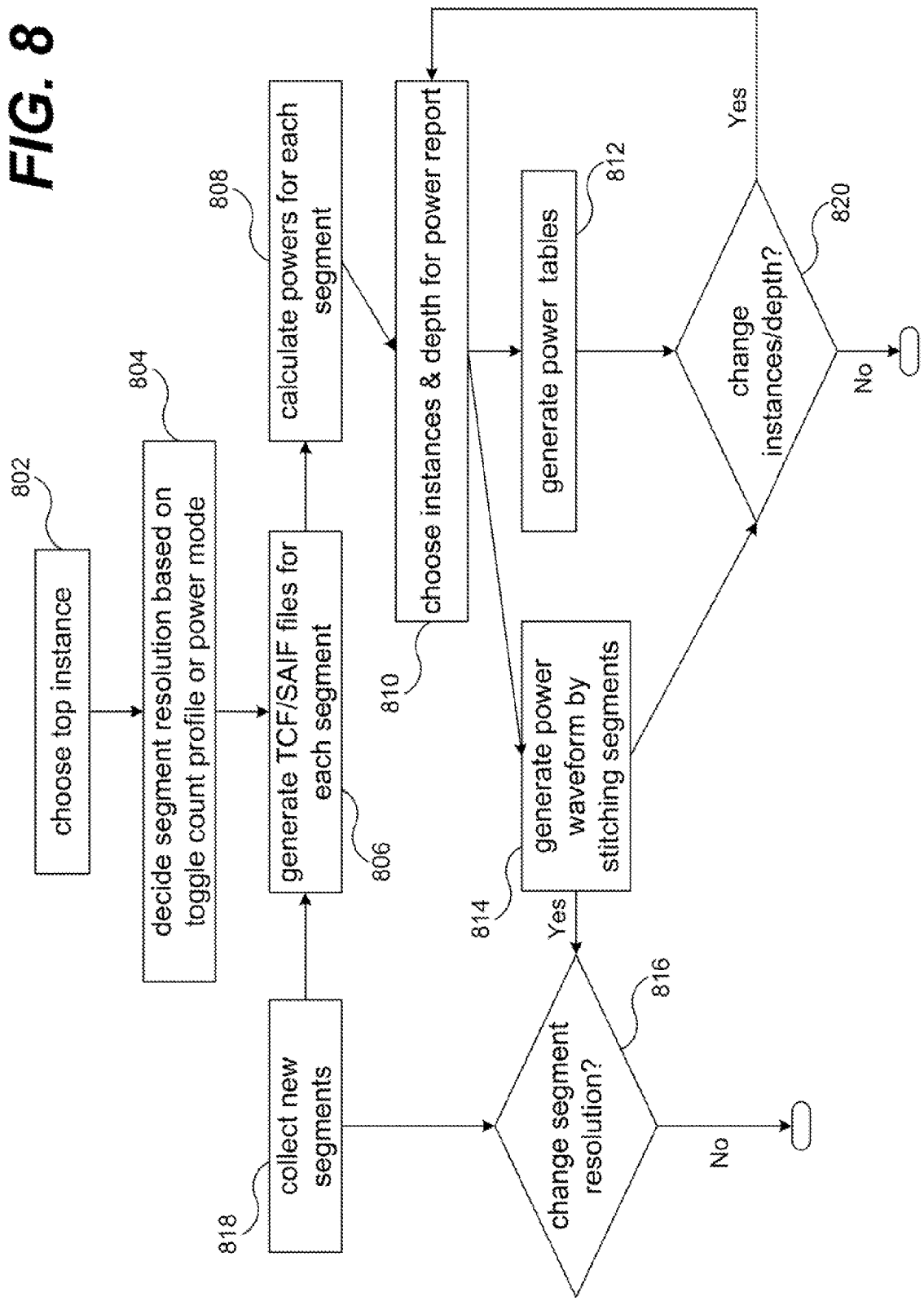
FIG. 8 shows further details related to the offline mode in the embodiment shown in FIG. 1.

FIG. 8 shows further details related to the offline mode 106 including steps for generating power profiles for functional blocks or instances (and their sub-instances) 316. First the top instance is chosen 802 and the segment resolution is decided (e.g., based on toggle count profile or power mode) 804. TCF/SAIF files can be generated for each segment 806, and power values can be calculated for each segment 808. Instance depth can be chosen for a power report 810 leading to the generation of power tables 812 and the generation of power waveforms by stitching segments together 814. Segment resolution can be changed 816 followed by collecting new segment values 818 and generation of new TCF/SAIF files 806. Also instances and depth can be changed 820 followed by new power reports 810.

The TCF/SAIF files 806 can be used for both dynamic power and static power calculation. For example, the duty counts in the TCF file is one factor for static power calculation as well as dynamic power calculation. In general, the power profile will include a total power profile, dynamic power profile (which can be further divided into internal power profile, net power profile), and static power profile.

Power profiles can be represented in waveform 814 or by tables 812 for given functional blocks over segments or for the top instance and given depth of sub-instances over segments among the operational modes. The segment resolution can be adjusted based on power consumption profile; that is, high power consumption segments can be narrowed down further. Once segment resolution is changed, TCF/SAIF files can be generated for newly created segments, and the power waveform and functional blocks/instances power tables can be updated. Once instances depth is changed, the power waveform and instances power tables can be updated.

FIG. 9 shows further details related to the offline mode 106 including a representative power consumption table 812 for the functional blocks. The functional blocks power consumption table shows all the functional blocks' power consumption values in each segment over operational modes. This table can be sorted based on total power (static power+dynamic power) over all segments; or sorted by operational mode, or by segment, or not sorted at all. If not sorted, the elements in table will be power consumption number only. If sorted, the element in table will be a pair of values (functional block name, power consumption value). As noted in the figure, a functional block can be a group of instances $P_{ij}$ that represents power numbers (e.g., for i=1, 2, 3, and j=1, 2, 3, 4), and the operational mode can be a power mode or an event/trigger related to a selected time window.

FIG. 10 shows further details related to the offline mode 106 including a representative power consumption table 812 for the instances. Notably the instances power consumption table in FIG. 10 has a structure that is similar to the functional blocks power consumption table in FIG. 9. As noted in the figure, instance i may be sub-instance of instance j where i<j, $P_{ij}$ represents power numbers (e.g., for i=1, 2, 3, and j=1, 2, 3, 4), and the operational mode may be a power mode or an event/trigger related to a selected time window.

Figures 12A, 12B:

Additional embodiments based on the above-described method 102 may depend on the requirements of the operational setting including the nature of the DUT. FIG. 11 shows a method 1102 for detecting peak power windows in accordance with a specific sequence of operations related to online mode 104, offline mode 106, and external power calculations 108. FIGS. 12A-12J show details for a specifically preferred embodiment related to the embodiment shown in FIG. 11. FIG. 12A shows details for a cell phone design that consists of multiple parts including alarm clock, calendar, camera, game, media player, music player, phone call, radio and video.

In the first step 1104, while the emulation system runs in an intended application environment, the transition activities of the DUT are recorded in files. Those data will be used in post processing for power analysis. The time windows of interest in recorded files may cover different operational modes. An operational mode can be a power mode (for CPF compliant designs only), or a time period with starting point marked by an event/trigger.

In the first step 1104, the design runs in the emulation system with an application environment to give instructions on how to operate the design. While the design runs, the DUT activities will be recorded in two files. The first file is a .phy file, which includes DUT's input/output pins values, sequential elements (such as flip flops) output pins, memory output values in each clock cycle, special signals' force/release/set values in asserted clock cycles. The second file is a .tc file, which includes a set of given instances' weighted toggle count, unweighted toggle count, and duty count per clock cycle.

Assume a user runs the cell phone design from time 0 to time 20000 clock cycles. Then two files "power.phy" and "power.tc" will be generated. These two files will include activity information for [0-20000) clock cycles. Both files are binary files for performance consideration. During these 20000 clock cycles, the application environment sets the cell phone in standby mode during [0,1000), [10000,14000) [19000,20000) time periods; and sets it in active mode during [1000,10000), [14000,19000) time periods.

In the second step 1106, the time windows of interest are divided into segments based on some criteria such as power modes (for CPF compliant designs only), threshold of transition activity level. Transition activity level is a measurement of the toggle count of all design nodes in the DUT or the selected functional block(s). Those time durations with low transition activity levels can be filtered out by assigning number of segment to zero for the given time window. Users also can specify the number of segments in each interested time window arbitrarily.

In the second step 1106, based on the "power.phy" file and the "power.tc" file, the power mode and toggle count information are extracted in power mode profile and toggle count profile. The profile can be displayed in waveform, also can be saved as text files.

In the given design, assume it has three different operational modes (such as power modes): standby, media, phone-Media. The mode "standby" means the cell phone is in standby state; "media" means the cell phone is used for applications such as camera/video/mediaPlayer/musicPlayer/radio/alarmClock/calendar/game; "phoneMedia" means the cell phone is used for making/receiving phone calls. During the phone session, the media applications may or may not be operated.

Figure 12C:
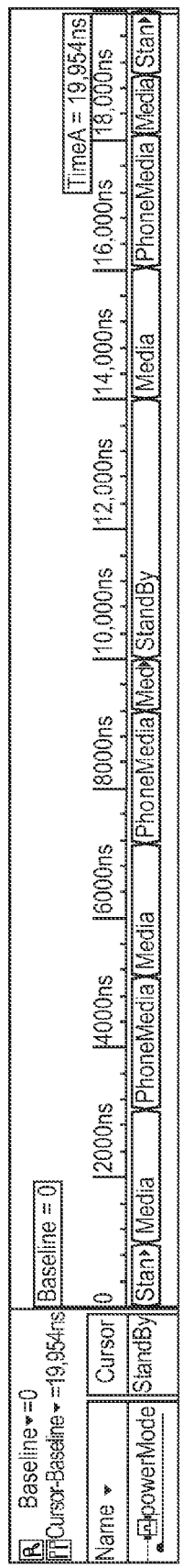
Figure 12D:
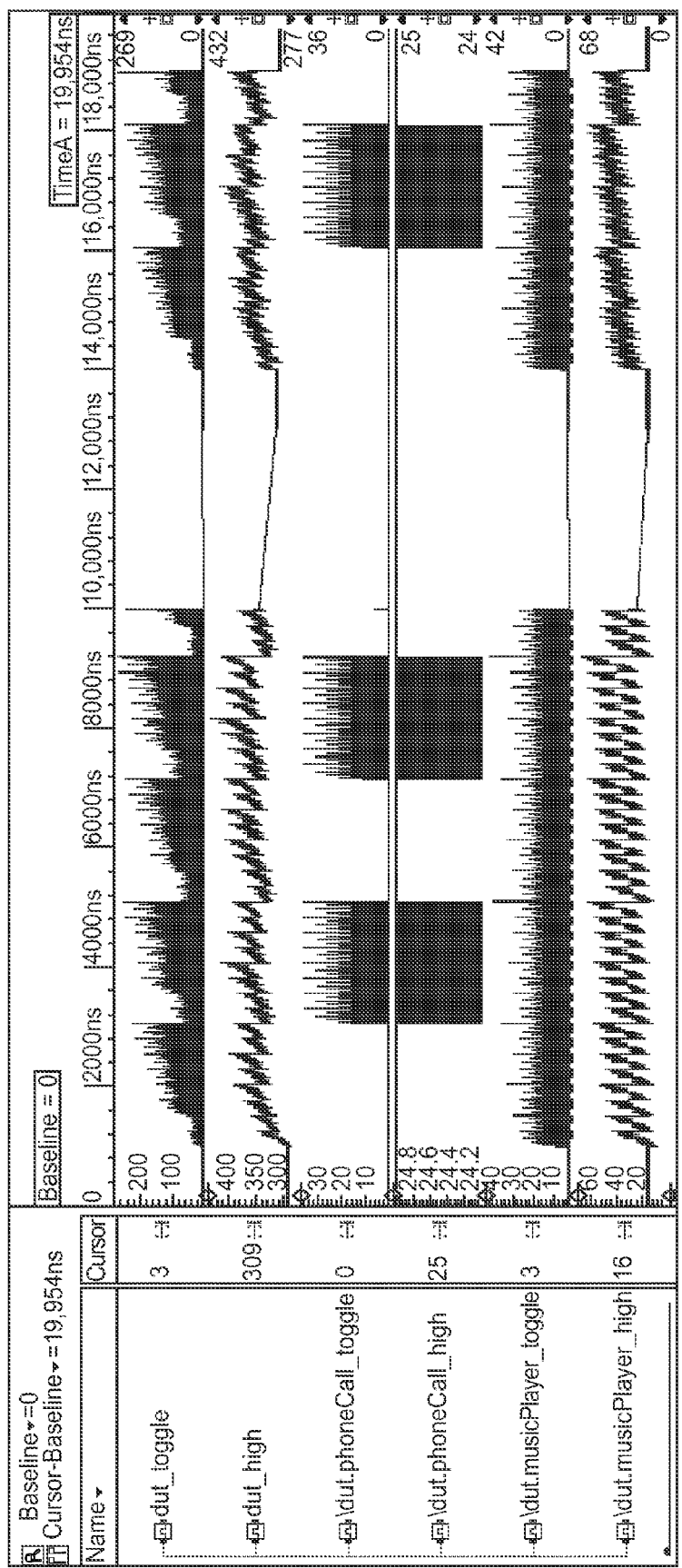

FIG. 12B shows the power mode profile in text form; including successive power modes over time (e.g., StandBy power mode during interval [0 999]). FIG. 12C shows the power mode profile in waveform form. FIG. 12D shows the toggle count profile in waveform form for a given set of instances "dut," "dut.phoneCall," and "dut.musicPlayer." Waveforms are shown for toggle counts (e.g., "dut_toggle," "dut.phoneCall_toggle," and "dut.musicPlayer_toggle") and duty counts per clock cycle (e.g., "dut_high," "dut.phoneCall_high," and "dut.musicPlayer_high").

Based on power mode profile and/or toggle count profile, time segments resolution are identified. For example, based on power mode profile, "standby" power mode has 1 or 0 segment; "phoneMedia" and "media" mode have 1 or more segments. Based on toggle count profile, the total toggle counts for "dut" less than 10 will be filtered out.

While the toggle count profile can be generated by the system without user input; the power mode profile needs user to provide CPF (Common Power Format) files. A user can choose to use the toggle count profile only. In this example, both power mode profile and toggle count profile will identify the time windows of interest: [1000,9999], [14000,18999]. The time windows [0 999], [10000, 13999] and [19000 19999] are eliminated for further peak power detection.

In the third step 1108, TCF/SAIF files are generated for time windows of interest with one TCF/SAIF file per each time segment. Meanwhile, the total toggle counts and duty counts in each TCF/SAIF are collected in a total toggle-count/duty-count profile that covers all segments that have TCF/SAIF files. For example, if a node is in logic "1" for 126 clock cycles in a 300 clock cycle duration, the duty count is 126 and the high-value probability is 42% for this particular node in this time duration. The duty count is then used for the leakage current computation. Users can observe the toggle count rate and duty count rate in TCF/SAIF files represented in waveform. Based on the TCF/SAIF toggle-count/duty-count profile, some of the segments can be further divided automatically for finer granularity. Some segments with low toggles count rates can be combined as one segment with coarse resolution thus reduce the number of the corresponding TCF/SAIF files. Users also can choose to divide any segment into multiple narrower segments.

In the third step 1108, one TCF/SAIF file will be generated per segment. When the number of TCF/SAIF files is large, the task to generate TCF/SAIF files and pass TCF/SAIF to a third party tool to calculate power consumptions may be time-consuming. How to divide the appropriate segments will be the key to improve the performance. The toggle count rate and duty count rate are used to divide the segments. Based on the divided segments, the complete TCF/SAIF files will be generated and passed to the third party power estimation tool.

Figure 12E:
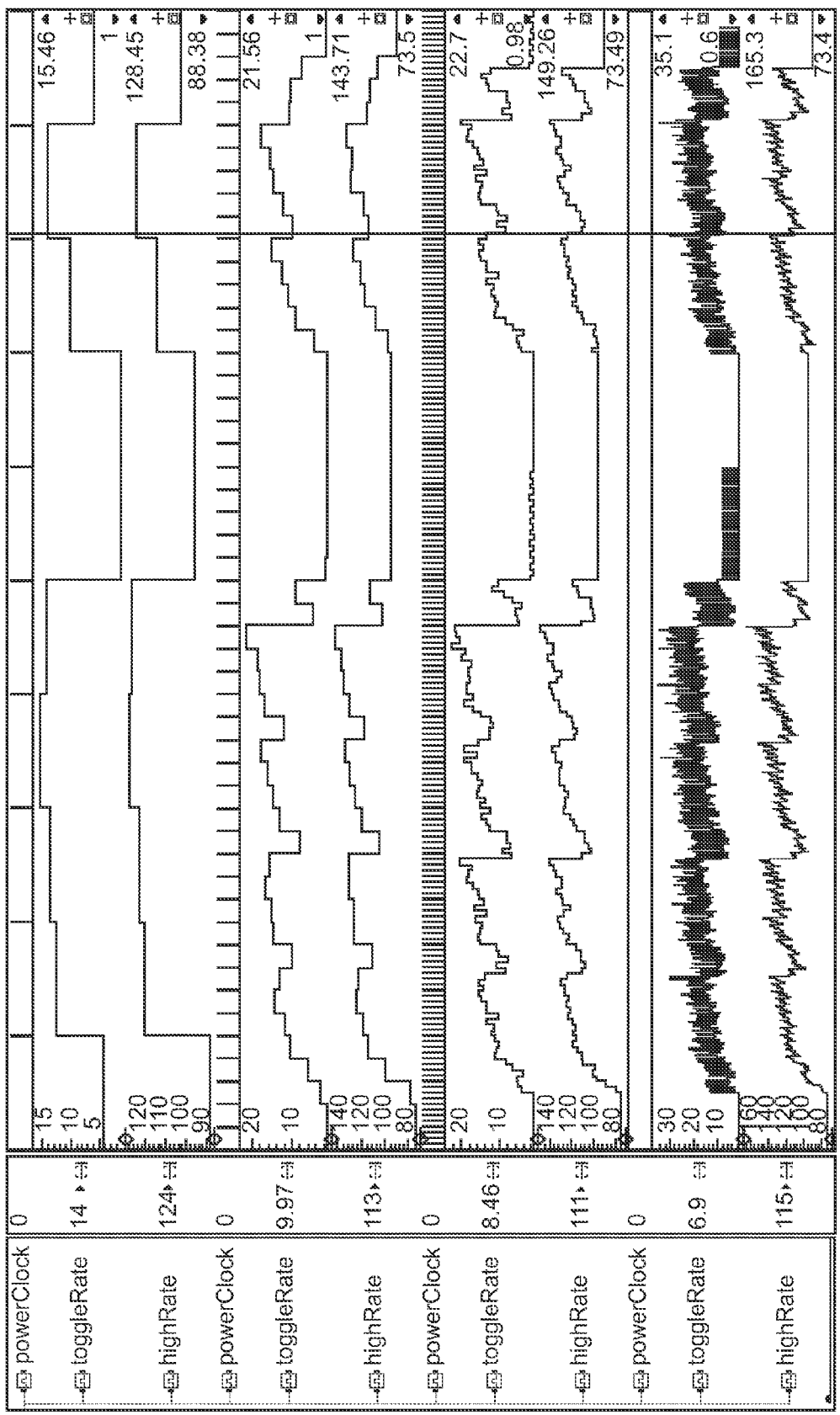

FIG. 12E shows the TCF/SAIF toggle count profile in waveform for the example design. In FIG. 12E, the first group three lines show toggle count rate and duty count rate waveforms with each segment length as 2000 clock cycles (for powerClock, toggleRate, and highRate); the second group of three lines show toggle count rate and duty count rate waveforms with each segment length as 400 clock cycles; the third group of three lines show toggle count rate and duty count rate with each segment length as 100 clock cycles; the fourth group of three lines show toggle count rate and duty count rate waveforms with each segment length as 10 clock cycles.

FIG. 12F shows part of the selected segments log content. For example, the first entry for segment [0 999] has duration 1000, ToggleRate=1.00 and HighRate=73.50. FIG. 12G demonstrates the master TCF file content. FIG. 12H demonstrates the slave TCF file content. FIG. 12I demonstrates the SAIF content.

The master TCF file in FIG. 12G specifies the pins in the TCF files. Each pin has an ID. For example, pin ce[2] has ID 66. The slave TCF file in FIG. 12H specifies the toggle counts and duty count probabilities for each pin. For example, for the pin with ID equal to 66, the toggle count is 25 and the duty count probability is 0.48 during a 200 ns long time segment [1800 ns 1999 ns].

The SAIF file in FIG. 12I specifies pins and the total time when they have value '0' and value '1', toggle counts from '1' to '0' or from '0' to '1' etc. For example, during a 1000 ns time segment, pin ce[2] has value '0' for 504 ns, has value '1' for 496 ns, and has 125 transitions of '0' to '1' or '1' to '0'.

In the fourth step 1110, the TCF/SAIF files are sent to a third party power estimation tool 108 to calculate the power consumed. The user can specify which instances and what depth of a given instance he is interested. The third party tool will report powers for those instances and their sub-instances in required hierarchy depth.

In the fourth step 1110, the TCF/SAIF files are sent to a third party tool 108 to calculate the power consumption. In this example, the Cadence™ RTL compiler was used to calculate power values.

In the fifth step 1112, power consumption profile is generated based on the power reports. The power consumption profile can be represented as either power consumption waveform over the segments, or power consumption tables of functional blocks/instances that show power consumption of functional blocks or instances in each segment.

Figure 12J:
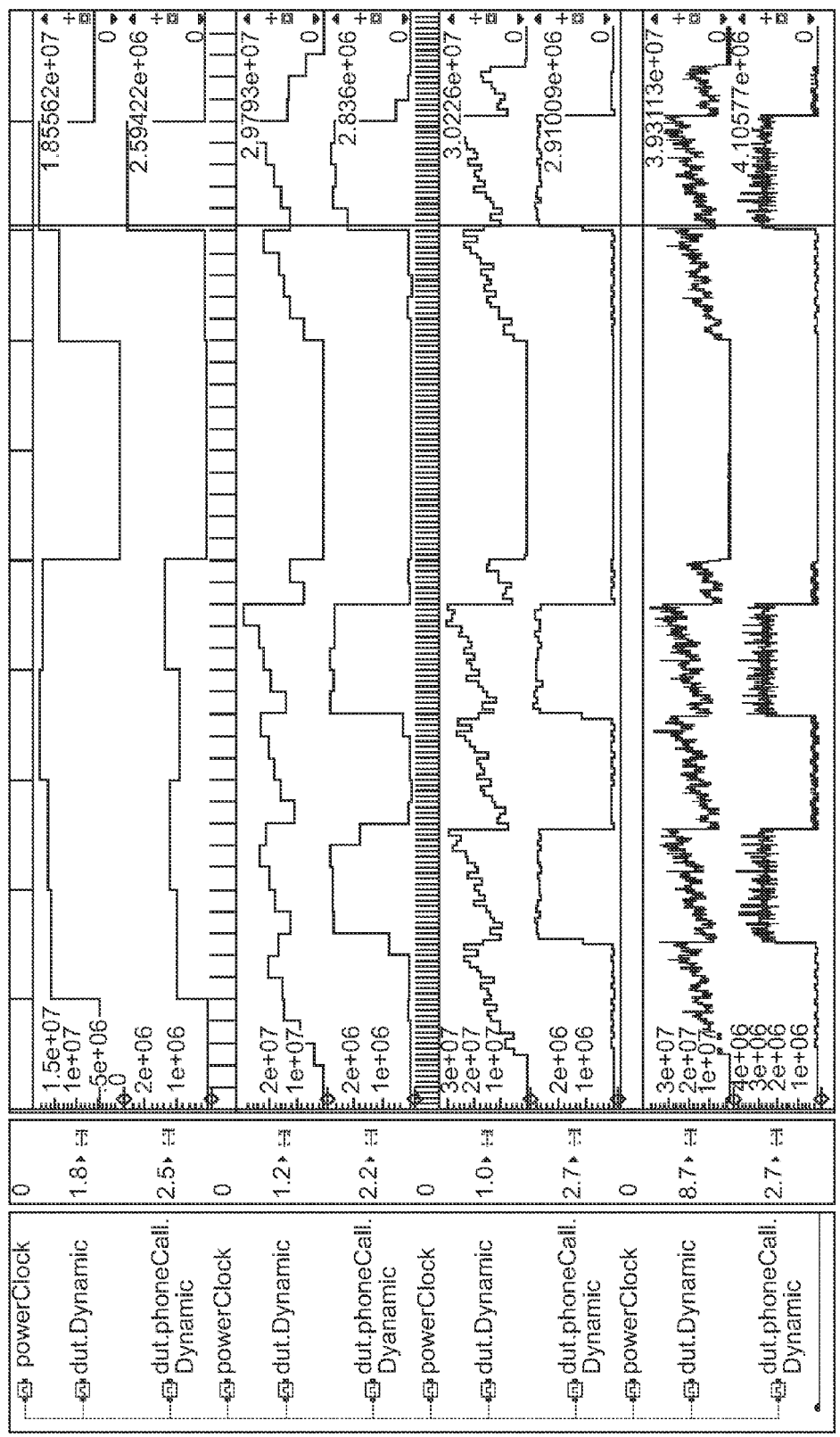

In the fifth step 1112, power consumption profiles can be generated in waveform format, or tables. FIG. 12J shows the power consumption for "dut" and "dut.phoneCall" in waveform. The first group of three lines shows the result with minimum segment length of 2000 clock cycles for powerClock, dut.Dynamic, and dut.phoneCall.Dynamic, where powerClock shows the segment boundaries. The second group of three lines shows the result with minimum segment length of 400 clock cycles. The third group of three lines shows the result with minimum segment length of 100 clock cycles. The fourth group of three lines shows the result with minimum segment length of 10 clock cycles.

In the sixth step 1114, tune the power consumption profile by adjusting resolution, or refine the resolution of the segments with higher power consumption. Based on the power consumption profile, the system can determine the appropriate threshold for power consumption values to identify the time segments that should be narrowed down further. The user can then repeat step three 1108 to step six 1114 until the desired power profiles with local peak powers are generated.

In the seventh step 1116, at least some values for results can be saved for display or further analysis including, for example, power consumption tables for functional blocks and instances (e.g., FIGS. 9-10). Alternatively, some derivative or summary form of the results can be saved for later use according to the requirements of the operational setting. The user can also run a different test to examine the power consumption profile under various application scenarios.

This power analysis technology is not restricted to the whole chip. It can be applied at block level as well. If the TCF/SAIF is generated only at block level, the power analysis can be focused on the block level and less computation time will be required. For example in case the detailed design or power information is not available for certain blocks (such as protected IP units from a third party) of the DUT, the user can choose to skip these blocks in order to work on the rest of the chip.

The above-described embodiments enable the use of filters with thresholds to locate the local peak powers for the DUT or block over the entire operational time span automatically. Once the time segments in all operational modes over the entire operational time span are located, this teaching presents a way to generate a power profile, which may be presented as a power consumption waveform, or a power consumption table for functional blocks or instances, over all time segments. In other words, a power consumption profile of functional blocks or instances in operational modes can be presented in waveforms or tables.

A functional block may consist of a group of instances. The instances can be sorted out based on their total toggle counts or power consumptions when dealing with the whole DUT. This will help users to identify which functional blocks need further analysis with finer resolution.

The circuit power mode profile, toggle count profile, TCF/SAIF toggle count profile, and power consumption profile can be generated in industry standard waveform database format, such as SST2 (viewable by the Cadence™ IUS SimVision product), or FSDB (viewable by the Novas™ Debussy product). With those databases, the waveforms can be viewed in the same waveform windows as the circuit signals using the same time reference. Once peak power windows are located in the waveform, values for the circuit signals can be checked in the time windows corresponding to peak power.

As illustrated by FIGS. 9, 10 and 12J, different power consumption profiles can be generated based on segment information and power consumption reports. For power type, users can have total power profile, dynamic power profile, and static power profile. For objects, users can have power profiles based on functional blocks, or power profiles based on individual instance and its sub-instances. This enables users to check each operational mode (which means a power mode or an event/trigger related interested time window) or functional blocks or instances with different profiles of power consumption.

As discussed above, certain embodiments of the present invention enable high-performance methods for detecting peak power windows under realistic environmental conditions. First, the circuit activities during a very long time run can be captured by an emulation system, which is typically much faster than a software based simulator. In general, emulation systems running in-circuit can guarantee that the peak powers are estimated in a realistic environment even in early stages of the circuit development (e.g., before the physical implementation). Next, total toggle counts, weighted toggle counts, and duty counts of a circuit per emulation clock cycle can be calculated by the emulation system. Then, by using toggle count rates and duty count rates instead of calculating actual power consumption values, changes in dynamic power consumption can be calculated faster. Additionally, because power consumption calculations are typically time-consuming, calculating power consumption values in selected segments instead of all segments of time windows can reduce the overall calculation time for determining a peak-power location.

Certain embodiments also enable high-performance methods for carrying out "what-if" power analysis based on circuit operational modes. In general, an operational mode determines the circuit behavior or the circuit state (e.g., whether a cell phone in standby mode, in active-call mode, or media-playing mode). By calculating and illustrating power profiles over relevant operational modes, corresponding circuit behaviors related to power issues are more easily identified (e.g., relevance of applying low-power techniques in trade-offs between standby mode and media-playing mode). Also, what-if power analysis based on circuit operational modes can desirably influence power related architecture selections. For example, Common Power Format (CPF) uses power modes, which are special operational modes that define circuit-power-supply-related states. Certain power modes correspond to applied low-power techniques including power shutoff (PSO), multiple power voltage supply (MSV) and dynamic voltage frequency scaling (DVFS). For example, a media playing mode can be designed with PSO, MSV, or DVFS so that the corresponding power mode can be PSO media playing power mode, MSV media playing power mode, or DVFS media playing power mode. Then, in a device that supports a media-playing mode, architectures with PSO or MSV or DVFS can be developed and analyzed to determine architectures that provide superior performance.

Additional embodiments relate to an apparatus for carrying out any one of the above-described methods, where the apparatus includes a computer for executing computer instructions related to the method. In this context the computer may be a general-purpose computer including, for example, a processor, memory, storage, and input/output devices (e.g., keyboard, display, disk drive, Internet connection, etc.). However, the computer may include circuitry or other specialized hardware for carrying out some or all aspects of the method. In some operational settings, the apparatus may be configured as a system that includes one or more units, each of which is configured to carry out some aspects of the method either in software, in hardware or in some combination thereof. At least some values for the results of the method can be saved, either in memory (e.g., RAM (Random Access Memory)) or permanent storage (e.g., a hard-disk system) for later use.

Additional embodiments also relate to a computer-readable medium that stores (e.g., tangibly embodies) a computer program for carrying out any one of the above-described methods by means of a computer. The computer program may be written, for example, in a general-purpose programming language (e.g., C, C++) or some specialized application-specific language. The computer program may be stored as an encoded file in some useful format (e.g., binary, ASCII).

Although only certain exemplary embodiments of this invention have been described in detail above, those skilled in the art will readily appreciate that many modifications are possible in the exemplary embodiments without materially departing from the novel teachings and advantages of this invention. For example, aspects of embodiments disclosed above can be combined in other combinations to form additional embodiments. Accordingly, all such modifications are intended to be included within the scope of this invention.

What is claimed is:

1. A method of analyzing power consumption for a DUT (device under test) that includes an integrated circuit or an electronic system, comprising:
   providing emulation data for states of the DUT in one or more time windows;
   determining operational mode values from the emulation data and a selection of operational modes that characterize circuit behavior in the one or more time windows;
   dividing each time window into one or more segments based on at least one power criterion;
   determining power-activity values for the one or more segments;
   determining power-consumption values for the one or more segments from the power-activity values;
   using the power-activity values and the power-consumption values to determine relative power activity across the one or more segments and automatically adjusting the one or more segments to target high power activity over operational modes in the one or more time windows by replacing at least one segment with a plurality of smaller segments when a corresponding power-activity value or power-consumption value is greater than a high-power threshold value; and
   saving one or more values for power activity of the DUT.

2. A method according to claim 1, wherein
   providing the emulation data includes using an emulation system to determine operations of the DUT in the one or more time windows, wherein the emulation system includes a combination of hardware and software for characterizing states of the DUT in the one or more time windows.

3. A method according to claim 1, wherein
   the operational mode values correspond to power usage for the DUT, and
   dividing each time window into one or more segments includes dividing each time window into one or more segments based on operational mode transitions of the DUT.

4. A method according to claim 1, wherein the power-activity values include values for at least one of an unweighted toggle count profile, a weighted toggle count profile, or a duty count profile for selected nodes of the DUT, wherein weights for the weighted toggle count profile are calculated from power models for nodes of the DUT.

5. A method according to claim 1, wherein determining the power-consumption values includes generating a waveform or tabular representation of a power-consumption profile for each of the one or more segments.

6. A method according to claim 1, wherein automatically adjusting the one or more segments includes filtering out at least one segment based on relatively low values for toggle counts or duty counts by comparing the toggle counts or duty counts to threshold values for filtering out the at least one segment.

7. A method according to claim 1, wherein automatically adjusting the one or more segments includes at least one of
   using a coarser resolution for portions of the time window with relatively low values for toggle counts or duty counts by comparing the toggle counts or duty counts to threshold values for using the coarser resolution, and
   using a higher resolution for portions of the time window with relatively high values for toggle counts or duty counts by comparing the toggle counts or duty counts to threshold values for using the higher resolution.

8. A method according to claim 1, wherein automatically adjusting the one or more segments includes using a finer resolution for portions of each time window with high power consumption values by comparing a corresponding power-consumption value with a threshold value for using a finer resolution.

9. A method according to claim 1, further comprising:
determining power-activity values for the adjusted one or more segments;
determining power-consumption values for the adjusted one or more segments from the power-activity values; and
saving one or more values for the power-activity values and the power-consumption values of the adjusted one or more segments.

10. A method according to claim 1, further comprising:
identifying one or more peak-power segments from the adjusted one or more segments by comparing a corresponding power-consumption value with a threshold value for identifying the one or more peak power segments, wherein each peak-power segment characterizes a peak power consumption across the one or more time windows;
identifying one or more nodes of the DUT with high power consumption in the one or more peak-power segments by examining corresponding power-consumption values for nodes of the DUT in the one or more peak power segments, and
saving one or more values for the one or more peak-power segments.

11. A method according to claim 1, wherein
the power-activity values include one or more toggle counts and one or more duty counts for the one or more segments, and
automatically adjusting the one or more segments includes replacing at least one segment with a plurality of smaller segments when a corresponding toggle count is greater than a threshold toggle count or a corresponding duty count is greater than a threshold duty count.

12. A method according to claim 1, wherein
the power-activity values include one or more toggle counts and one or more duty counts for the one or more segments, and
determining the power-consumption values from the power-activity values includes using a toggle count corresponding to a component to calculate an internal-power value for the component and using the duty count for the component to calculate a power-leakage value for the component.

13. A method according to claim 1, wherein the power-activity values include at least one toggle count that is weighted by a relative average value for power corresponding to the toggle count.

14. A method according to claim 1, wherein dividing each time segment into one or more segments based on at least one power criterion includes:
applying a first power criterion by specifying a top instance for the DUT, and using a top-instance criterion to specify one or more first segments that divide each time window, the top-instance criterion including at least one of power-mode profile for the one or more time windows or a top-instance toggle count that include the nodes of the top instance; and
applying a second power criterion by specifying an instance depth for resolving the top instance, generating a plurality of specified-depth toggle count profiles at the instance depth for the one or more first segments that divide each time window, and using the specified-depth toggle count profiles to specify one or more second segments that divide each time window by comparing the specified-depth toggle count profiles to a toggle-count threshold value.

15. An apparatus for analyzing power consumption for a DUT (device under test) that includes an integrated circuit or an electronic system, the apparatus comprising a computer for executing computer instructions, wherein the computer includes computer instructions for:
providing emulation data for states of the DUT in one or more time windows;
determining operational mode values from the emulation data and a selection of operational modes that characterize circuit behavior in the one or more time windows;
dividing each time window into one or more segments based on at least one power criterion;
determining power-activity values for the one or more segments;
determining power-consumption values for the one or more segments from the power-activity values;
using the power-activity values and the power-consumption values to determine relative power activity across the one or more segments and automatically adjusting the one or more segments to target high power activity over operational modes in the one or more time windows by replacing at least one segment with a plurality of smaller segments when a corresponding power-activity value or power-consumption value is greater than a high-power threshold value; and
saving one or more values for power activity of the DUT.

16. An apparatus according to claim 15, wherein providing the emulation data includes using an emulation system to determine operations of the DUT in the one or more time windows, wherein the emulation system includes a combination of hardware and software for characterizing states of the DUT in the one or more time windows.

17. An apparatus according to claim 15, wherein
the operational mode values correspond to power usage for the DUT, and
dividing each time window into one or more segments includes dividing each time window into one or more segments based on operational mode transitions of the DUT.

18. An apparatus according to claim 15, wherein the power-activity values include values for at least one of an unweighted toggle count profile, a weighted toggle count profile, or a duty count profile for selected nodes of the DUT, wherein weights for the weighted toggle count profile are calculated from power models for nodes of the DUT.

19. An apparatus according to claim 15, wherein determining the power-consumption values includes generating a waveform or tabular representation of a power-consumption profile for each of the one or more segments.

20. An apparatus according to claim 15, wherein automatically adjusting the one or more segments includes filtering out at least one segment based on relatively low values for toggle counts or duty counts by comparing the toggle counts or duty counts to threshold values for filtering out the at least one segment.

21. An apparatus according to claim 15, wherein automatically adjusting the one or more segments includes at least one of
using a coarser resolution for portions of the time window with relatively low values for toggle counts or duty counts by comparing the toggle counts or duty counts to threshold values for using the coarser resolution, and
using a higher resolution for portions of the time window with relatively high values for toggle counts or duty counts by comparing the toggle counts or duty counts to threshold values for using the higher resolution.

22. An apparatus according to claim 15, wherein automatically adjusting the one or more segments includes using a finer resolution for portions of each time window with high power consumption values by comparing a corresponding power-consumption value with a threshold value for using a finer resolution.

23. An apparatus according to claim 15, wherein the computer further includes computer instructions for:
    determining power-activity values for the adjusted one or more segments;
    determining power-consumption values for the adjusted one or more segments from the power-activity values; and
    saving one or more values for the power-activity values and the power-consumption values of the adjusted one or more segments.

24. An apparatus according to claim 15, wherein the computer further includes computer instructions for:
    identifying one or more peak-power segments from the adjusted one or more segments by comparing a corresponding power-consumption value with a threshold value for identifying the one or more peak power segments, wherein each peak-power segment characterizes a peak power consumption across the one or more time windows;
    identifying one or more nodes of the DUT with high power consumption in the one or more peak-power segments by examining corresponding power-consumption values for nodes of the DUT in the one or more peak power segments, and
    saving one or more values for the one or more peak-power segments.

25. An apparatus according to claim 15, wherein the computer includes a processor with memory for executing at least some of the computer instructions.

26. An apparatus according to claim 15, wherein the computer includes circuitry for executing at least some of the computer instructions.

27. A non-transitory computer-readable medium that stores a computer program for analyzing power consumption for a DUT (device under test) that includes an integrated circuit or an electronic system, wherein the computer program includes instructions for:
    providing emulation data for states of the DUT in one or more time windows;
    determining operational mode values from the emulation data and a selection of operational modes that characterize circuit behavior in the one or more time windows;
    dividing each time window into one or more segments based on at least one power criterion;
    determining power-activity values for the one or more segments;
    determining power-consumption values for the one or more segments from the power-activity values;
    using the power-activity values and the power-consumption values to determine relative power activity across the one or more segments and automatically adjusting the one or more segments to target high power activity over operational modes in the one or more time windows by replacing at least one segment with a plurality of smaller segments when a corresponding power-activity value or power-consumption value is greater than a high-power threshold value; and
    saving one or more values for power activity of the DUT.

* * * * *

UNITED STATES PATENT AND TRADEMARK OFFICE
CERTIFICATE OF CORRECTION

| | |
|---|---|
| PATENT NO. | : 8,108,194 B2 |
| APPLICATION NO. | : 12/346004 |
| DATED | : January 31, 2012 |
| INVENTOR(S) | : Bing Zhu et al. |

It is certified that error appears in the above-identified patent and that said Letters Patent is hereby corrected as shown below:

In column 6, line 27, delete "SST2or" and insert -- SST2 or --, therefor.

In column 10, line 23, delete "1,3," and insert -- 1, 3, --, therefor.

Signed and Sealed this
Twenty-ninth Day of May, 2012

David J. Kappos
*Director of the United States Patent and Trademark Office*